US007010308B2

(12) United States Patent
Hendrey

(10) Patent No.: US 7,010,308 B2
(45) Date of Patent: Mar. 7, 2006

(54) MANAGING AND QUERYING MOVING POINT DATA

(75) Inventor: Geoffrey R. Hendrey, San Francisco, CA (US)

(73) Assignee: Telcontar, San Jose, CA (US)

( * ) Notice: Subject to any disclaimer, the term of this patent is extended or adjusted under 35 U.S.C. 154(b) by 495 days.

(21) Appl. No.: 10/012,367

(22) Filed: Dec. 12, 2001

(65) Prior Publication Data

US 2002/0151315 A1    Oct. 17, 2002

Related U.S. Application Data

(60) Provisional application No. 60/254,922, filed on Dec. 13, 2000.

(51) Int. Cl.
H04Q 7/00 (2006.01)
(52) U.S. Cl. .................................. 455/456.5; 455/433
(58) Field of Classification Search ................ 455/433, 455/414.1–414.3, 456.1, 456.3, 456.5, 41.2; 709/216–221
See application file for complete search history.

(56) References Cited

U.S. PATENT DOCUMENTS

| 5,043,736 A | | 8/1991 | Darnell et al. |
|---|---|---|---|
| 5,295,180 A | | 3/1994 | Vendetti et al. |
| 5,539,922 A | * | 7/1996 | Wang ..................... 455/456.2 |
| 5,568,153 A | | 10/1996 | Beliveau |
| 5,758,288 A | | 5/1998 | Dunn et al. |
| 5,761,648 A | | 6/1998 | Golden et al. |
| 5,774,802 A | | 6/1998 | Tell et al. |
| 5,852,775 A | | 12/1998 | Hidary |
| 5,873,040 A | | 2/1999 | Dunn et al. |
| 5,884,272 A | | 3/1999 | Walker et al. |
| 5,918,180 A | | 6/1999 | Dimino |
| 5,953,400 A | | 9/1999 | Rosenthal et al. |
| 5,963,864 A | | 10/1999 | O'Neil et al. |
| 5,966,696 A | | 10/1999 | Giraud |
| 5,974,393 A | | 10/1999 | McCullough et al. |
| 5,982,281 A | | 11/1999 | Layson, Jr. |
| 5,995,015 A | | 11/1999 | DeTemple et al. |
| 6,018,699 A | | 1/2000 | Baron, Sr. et al. |
| 6,041,358 A | * | 3/2000 | Huang et al. ............... 709/238 |
| 6,044,261 A | | 3/2000 | Kazmi |
| 6,055,434 A | | 4/2000 | Seraj |
| 6,060,995 A | | 5/2000 | Wicks et al. |
| 6,061,561 A | | 5/2000 | Alanara et al. |
| 6,061,681 A | | 5/2000 | Collins |
| 6,067,045 A | | 5/2000 | Castelloe et al. |
| 6,067,356 A | | 5/2000 | Lautenschlager et al. |

(Continued)

FOREIGN PATENT DOCUMENTS

EP    0 708 571 A2    4/1996

(Continued)

OTHER PUBLICATIONS www.signalsoftcorp.com.

(Continued)

Primary Examiner—Nick Corsaro
(74) Attorney, Agent, or Firm—Fenwick & West LLP

(57) ABSTRACT

An improved client locating and user discovery system is disclosed. Methods and systems are described that provide the ability for a telecommunications network to frequently update the location data for telecommunications units within the network, while preventing the performance degradation that is inherent in the prior art. In the patented invention, the most frequently updated data is stored outside the main database in active memory in a tree structure, and is accessed through an API that converts the tree data into a database query language readable format.

16 Claims, 19 Drawing Sheets

U.S. PATENT DOCUMENTS

| | | | |
|---|---|---|---|
| 6,073,138 | A | 6/2000 | de l'Etraz et al. |
| 6,091,956 | A | 7/2000 | Hollenberg |
| 6,119,014 | A | 9/2000 | Alperovich et al. |
| 6,157,841 | A | 12/2000 | Bolduc et al. |
| 6,166,685 | A | 12/2000 | Soliman |
| 6,181,927 | B1 | 1/2001 | Welling, Jr. et al. |
| 6,208,866 | B1 | 3/2001 | Rouhollahzadeh et al. |
| 6,233,506 | B1 | 5/2001 | Obradovich et al. |
| 6,286,005 | B1 | 9/2001 | Cannon |
| 6,292,672 | B1 | 9/2001 | Chavez, Jr. |
| 6,292,743 | B1 | 9/2001 | Pu et al. |
| 6,332,127 | B1 | 12/2001 | Bandera et al. |
| 6,360,102 | B1 | 3/2002 | Havinis et al. |
| 6,370,539 | B1 * | 4/2002 | Ashby et al. ............... 707/102 |
| 6,377,793 | B1 | 4/2002 | Jenkins |
| 6,381,465 | B1 | 4/2002 | Chern et al. |
| 6,397,057 | B1 | 5/2002 | Malackowski et al. |
| 6,400,956 | B1 | 6/2002 | Richton |
| 6,411,891 | B1 | 6/2002 | Jones |
| 6,442,391 | B1 | 8/2002 | Johansson et al. |
| 6,463,180 | B1 * | 10/2002 | Krishnaswamy ............ 382/240 |
| 6,484,148 | B1 | 11/2002 | Boyd |
| 6,505,046 | B1 | 1/2003 | Baker |
| 6,549,768 | B1 | 4/2003 | Fraccaroli |
| 6,594,483 | B1 | 7/2003 | Nykanen et al. |
| 6,647,257 | B1 | 11/2003 | Owensby |
| 6,650,902 | B1 * | 11/2003 | Richton ................... 455/456.3 |
| 6,750,883 | B1 * | 6/2004 | Parupudi et al. ............ 715/763 |
| 6,826,598 | B1 * | 11/2004 | Titmuss et al. ............. 709/212 |
| 6,836,667 | B1 | 12/2004 | Smith, Jr. |
| 2001/0027111 | A1 | 10/2001 | Motegi et al. |

FOREIGN PATENT DOCUMENTS

| | | |
|---|---|---|
| WO | WO97/13387 | 4/1997 |
| WO | WO 97/14054 | 4/1997 |
| WO | WO 97/16934 | 5/1997 |
| WO | WO97/41654 | 11/1997 |
| WO | WO 98/03025 | 1/1998 |
| WO | WO 98/36585 | 8/1998 |
| WO | WO 99/33199 | 7/1999 |
| WO | WO 99/33293 | 7/1999 |
| WO | WO 99/56144 | 11/1999 |
| WO | WO 99/66757 | 12/1999 |
| WO | WO 00/04730 | 1/2000 |
| WO | WO 00/19344 | 4/2000 |
| WO | WO 00/22860 | 4/2000 |
| WO | WO 00/35216 | 6/2000 |
| WO | WO-00/40038 | 7/2000 |
| WO | WO 00/51333 | 8/2000 |
| WO | WO 00/62564 | 10/2000 |
| WO | WO 01/15480 A1 | 3/2001 |
| WO | WO 01/24551 A1 | 4/2001 |
| WO | WO 01/26408 A1 | 4/2001 |

OTHER PUBLICATIONS www.sigma-1.com.

www.iprox.com.

Hadfield, Peter, "You can run, but you can't hide," Aug. 21, 1999, New Scientist, 1 page.

PCT International Search Report, International Application No. PCT/US00/29516, Sep. 24, 2003, 6 pages.

Krishna et al., "Static and Adaptive Location management in Mobile Wireless Networks," Computer Communications, Elsevier Science Publishers BV, vol. 19, No. 4, Apr. 1, 1996, pp. 321-334.

Nelson, "User Interaction with Machines on the Move: Location Aware Computing," Computers in Industry, Elsevier Science Publishers BV, vol. 29, No. 1, Jul. 1, 1996, pp. 63-70.

PCT International Search Report, International Application No. PCT/US01/47952, Jul. 14, 2003, 5 pages.

* cited by examiner

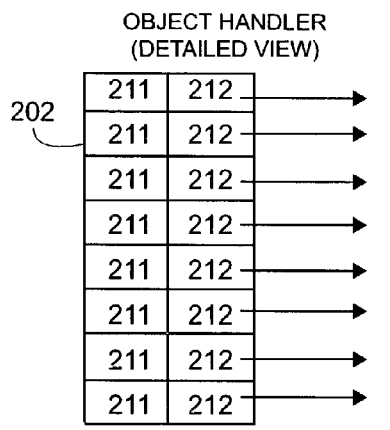
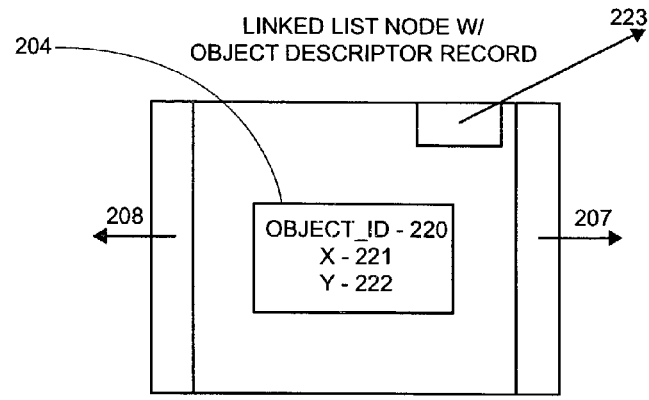
Figure 2A    Figure 2B
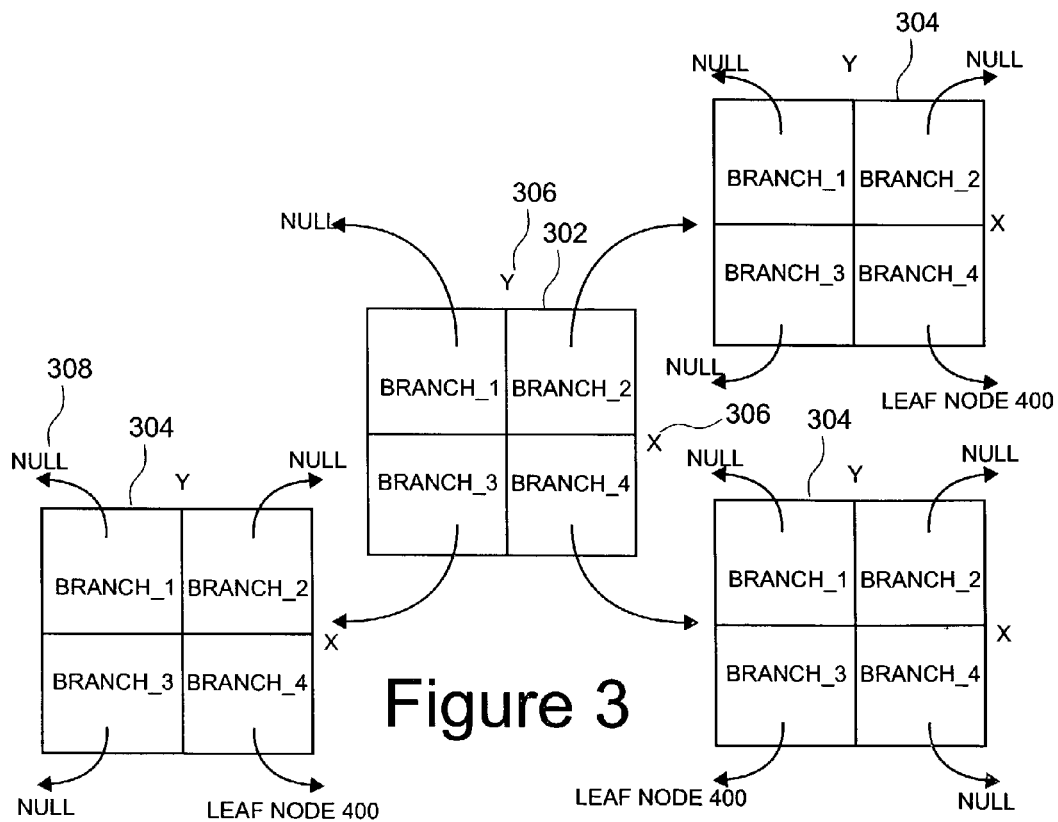
Figure 3

MANAGING AND QUERYING MOVING POINT DATA

This application claims priority to provisional U.S. Application Ser. No. 60/254,922, filed Dec. 13, 2000, herein incorporated by reference.

FIELD OF THE INVENTION

This invention relates the mobile telecommunications systems. In particular, aspects of the invention relate to a method and system for updating and querying large numbers of records representing users whose locations frequently change.

BACKGROUND OF THE INVENTION

Mobile telecommunications units (MUs) such as cell phones and other related devices are now commonplace in our culture. Historically, MUs have typically been treated as a movable version of a standard telephone. In particular, a main object of current systems has been to hide the fact that the user of the MU is in fact mobile by providing a standard telephone number for reaching the MU regardless of location. Thus, MUs are typically used in a manner so as to conceal the location of the mobile user to make it appear to the outside world that the unit is a traditional stationary unit (SU). Similarly, when telecommunication system users place phone calls using MUs, they dial traditional telephone numbers as if they were in their home location, making call placement appear to users of MUs as if they were in their home cities, regardless of their actual location.

FCC Wireless Requirements

A wireless phone is a valuable emergency tool that can be taken almost anywhere. For many Americans, the ability to call for help in an emergency is the principal reason they own a wireless phone. But that help may never arrive, or may be too late, if the 911 call does not get through or if emergency response teams cannot locate the user quickly. In a series of orders since 1996, the Federal Communications Commission (FCC) has taken action to improve the quality and reliability of 911 emergency services for wireless phone users, by adopting rules to govern the availability of basic 911 services and the implementation of enhanced 911 (E911) for wireless services. The E911 rules seek to improve the reliability of wireless 911 services and to provide emergency services personnel with location information that will enable these emergency services personnel to locate and assist wireless 911 callers. The E911 rules require that wireless carriers deliver 911 calls and implement the technology that provides the 911 emergency call response center with information about the caller's location.

The approximate location of an MU is always known to a telecommunication infrastructure in the form of which cell base station the MU is communicating with (e.g., as taught in U.S. Pat. No. 6,061,561). A prime motivation for being able to access such information is to determine the location of MU users who place calls to Emergency-911 call centers or are otherwise in distress. In order to improve the effectiveness of Emergency-911 services in particular, more accurate position information is being made available via the telecommunication infrastructure. For example, U.S. Pat. No. 6,067,045 teaches the use of combining Global Positioning System (GPS) information with a telecommunication infrastructure to accurately determine the position of an MU, whereas U.S. Pat. No. 6,055,434 teaches the use of low powered beacons scattered throughout MU usage areas. Regardless of the technology used, the end result is that telecommunication systems are rapidly being provided with an ability to accurately determine the geographic location of an individual MU. The advent of precise location information for MUs has made possible new services dependent on a known location of a MU.

The availability of position information with respect to MU users makes location-based services (LBS) possible. Examples of location-based services include nearest friend finder and dating applications, nearest restaurant finder applications and advertisements that are delivered to MUs when the MU is in a particular location. These services are known, respectively, as mobile to mobile applications, mobile to static applications, and static to mobile applications.

Virtually all location-based services that exist today are designed to provide a mobile user with information relative to a point of interest ("POI") or a static location. For example, a mobile user may request the location of movie theaters or restaurants proximate to him, even within his zip code. ZIP code level locating capability has typically been used in the mobile environment because it is often the only information the user may have available. Additionally, ZIP code level positioning is made available automatically through networks such as PalmNet.

Fine grain locating capability is available in the US mainly through on-the-fly geocoding of street address. Companies such as MapQuest exemplify this technique. A drawback to this technique is that it requires the user to manually enter his or her street address into the MU. Automatic locating capability is currently available in Japan, Europe, and soon will be available in the US as a result of the FCC-E911 mandate. Precise location will become a commodity and a wealth of mobile applications will seek to build services based on that attribute.

Precise and frequent knowledge of a mobile unit's ("MU") location will enable a new generation of mobile service: mobile unit to mobile unit. This knowledge will additionally allow improved versions of mobile unit to stationary unit services. An MU-to-MU service seeks to identify groups of proximate users, formed dynamically, using location and profile information as criteria. For example, consider a business networking service that would allow a salesman at a tradeshow to locate and get in touch with potential clients and leads. Or consider a static to mobile application such as a proximity-based advertising engine that publishes location-based promotions to nearby subscribers.

As devices become capable of supporting applications such as interactive proximity based wireless chat, people finder and/or messaging, the value of location in determining the location of friends and consumers will increase. Location will become critical in creating the "network effect" whereby messages are automatically initiated between proximate users and service providers.

ZIP code based POI locating, as is known in the art, can be performed with a traditional Relational Database Management System ("RDBMS"). A standard Structured Query Language ("SQL") query searches the database for entries with the requested ZIP code. At no time is the distance from the mobile user to the point of interest actually computed. Therefore, ZIP based MU-to-POI applications are trivial to implement.

At a finer granularity level, geocoding can be performed on a database to associate each entry with a latitude and longitude. If the user's latitude and longitude is known, the closest POI can be determined by a brute force search ("within distance query"). The distance to every POI can be approximated by treating the local area as a flat X-Y grid and calculating SQRT ($\Delta X^2 + \Delta Y^2$) for each POI. While the simulation can be performed for a few users, scaling to one million users would involve at least ten million floating-point operations per within distance query. This technique quickly becomes far too computation-intensive to work on a database with any more than a handful of geocoded entries.

An accepted technique for overcoming this challenge is to perform a tessellation on the spatial database after the data has been bulk loaded into the database. The process of tessellating a database, i.e. overlaying logical tiles on the data, can be a challenging endeavor. For example, a poorly tuned tessellation would create fixed sized tiles. Each region is divided into an even number of fixed sized tiles that cover the possible range of geographic coordinates. For a static dataset (such as geocoded yellow page business listings), it is possible to know the extent of the region a priori. For example, a geocoded yellow page business listing database for a particular city might specify extents of [−122.2, −123.0] [37.0, 37.8]. Additionally, tiles are created even where there is no data within the tile.

After the initial bulk load of data, an index is created to allow the tile of any point to be determined quickly. Consider the case where one wants to find all points within 0.7 degrees of [122.223, 37.056]. The exact within distance querying algorithms will vary by implementation. However, the process for performing a within distance query typically begins with finding a starting tile in the index, then searching within the tile. Consulting the index, we begin by searching all points in tile 1, then expanding our search to adjacent tiles whose bounds fall at least partially within the search radius. If each tile contains a relatively small number of points, and the search radius is small, the within distance computation will be performed only on a small subset of the database.

With geocoded data loaded in bulk, it is possible to "tune" the database for higher performance. In areas with high point density, tiles can be recursively tessellated. This places fewer points per tile and results in faster queries if the query radius falls inside a tile. Therefore, fast queries can only be guaranteed if the database is properly tessellated. Typically, proper tessellation involves running tuning scripts to determine the optimal tessellation level, and requires the data to be precisely indexed. Record insertions must then update the index making it an expensive process. In addition, the coordinate extents must be known in advance to ensure that all inserted records fall inside a tile.

If (1) the data is bulk loaded initially, (2) the database is well-tuned, and (3) there are few transactional inserts, then a tessellated database can provide high performance for a static dataset. Databases such as Oracle Spatial and Informix Spatial, using R-Tree indices, can quickly perform a within distance query on a geocoded yellow page database, if properly tuned by a database administrator ("DBA"). However, performance immediately becomes unacceptable when data is transitionally loaded (e.g. location data continuously being updated) and the coordinate extents are unknown, for example in the case where there exist unlimited or very large geographic boundaries within which a mobile unit might be located.

Consider a scenario in which a tessellated spatial database using an R-Tree index attempts to store the real-time locations of millions of mobile users. A number of inefficiencies will be encountered:

Unknown Extents: For a small-scale local service it may be possible to set the coordinate extents to a square surrounding a city. For a scaleable system that can service users in any nation or on any scale, the extents must be set to cover the entire surface of the earth as any user can potentially log in from anywhere (Japan, Sweden, etc.). Therefore, either the extents are set to cover the latitude and longitude of the entire earth, or multiple database instances must be used, each covering separate extents. This is clearly an unacceptable solution given the overhead and costs associated with database hardware and administration.

Poor Tessellation: In order to achieve high computing performance, the spatial database must be tuned before it is accessed. In this instance, and while many parameters must also be tuned, we focus on tuning as principally involving the determining parameters such as the tessellation level. Tuning is only possible if the locations of point data are known at the time of tuning. Clearly, the locations of MUs cannot be known before the MUs log in and update their position. Therefore, tessellation level optimization will not be possible and many, if not most, tiles will cover unpopulated areas. Similarly, in densely populated areas there will be too many users per tile.

Not Adaptive: Because the locations of users will constantly shift, an adaptive scheme would have to re-tessellate the database on the fly. This solution is an expensive operation and would have to be performed often to maintain any form of consistency with actual user locations.

Expensive Transactions: Every time a MUs position changes, the database index must be rebuilt, regardless of whether or not any re-tessellation is performed.

Degradation: In a database that is not properly implemented for moving point data, performance degradation will occur as a function of the number of transactions, the number of rows, and data distribution.

The key reason for the existence of such problems is that traditional spatial databases are not optimized for moving point data. Thus, it would be an improvement in the art to provide a database that can effectively and efficiently manage moving point data representing large numbers of users.

BRIEF SUMMARY OF THE INVENTION

Aspects of the present invention solve one or more of the above-stated problems and/or provide improved methods for managing moving point data, and implementing client locating and user discovery systems.

In one aspect of the invention, a new type of client locating and user discovery computer architecture is provided for storing moving point data. This architecture has a moving point server for managing moving point data. This architecture also has an API that stores instructions for accessing the moving point data that is stored on the moving point server. A database server provides storage for data related to the moving point data. The API and the moving point server communicate using a reliable connection such as TCP. The moving point data may be stored in active memory on the moving point server. Also, in some embodiments, the moving point data is stored in a tree structure such as a quad-tree located on the moving point server. In other embodiments, this architecture includes an object handler for indexing object descriptor records that are stored on the moving point server. In still other embodiments, object descriptor records that share identical location coordinates are placed together in linked lists.

In another aspect of the invention a method for managing moving point data is provided. The method involves storing moving point data in a tree data structure in active memory. The method further involves accessing the moving point data using stored instructions from an API, and converting the moving point data to a SQL (or some other data query language) readable format. Is some embodiments of the invention, the tree structure is a quad-tree, but in other embodiments other tree structures are used.

In another aspect of the invention, a method is provided for determining the proximity of telecommunications units in a telecommunications network. This method involves receiving a location of a first telecommunications unit. Then, a leaf-node is located in a tree data structure that encompasses the location of the first telecommunications unit. A data set is retrieved from the leaf node that represents telecommunications units that are within a physical proximity to the first telecommunications units.

In another aspect of the invention a memory is provided for storing a moving point data object having an identifying characteristic and a non-identifying characteristic for access by an API being executed on a computer system. The memory includes an object handler array for storing the identifying characteristic of the moving point data object. The memory also includes a first object descriptor record referenced by the object handler array. This object descriptor record stores the non-identifying characteristic of the moving point data object. The memory also includes a linked list for linking the object descriptor record to a second object descriptor record having a similar non-identifying characteristic. A tree structure is also present having a leaf node that is referenced by the first object descriptor record. A data structure contained within the leaf node having stored in it the non-identifying characteristic of the moving point data object and also having stored in it a reference to the first object descriptor record.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 3 illustrates a detailed view of a tree structure shown in FIG. 2.

DETAILED DESCRIPTION OF THE INVENTION

Exemplary embodiments of the present invention allow a telecommunications provider to provide MU-to-MU and MU-to-SU services by maintaining accurate and timely location data for individual telecommunications units. For example, a salesman at a tradeshow can use his cell phone to locate and get in touch with potential clients and leads by asking the service to provide users that fit a particular user profile and are proximately located to him. While these exemplary embodiments are shown within the field of mobile telecommunications, it can be readily appreciated by one skilled in the art that the present invention may be used in other fields as well. For example, aspects of the present invention may be used to maintain timely location data for airplanes or automobiles. In fact, this invention may prove useful in any situation where large numbers of data records must be maintained, and certain values within those records are updated frequently.

One embodiment of the invention is a system architecture capable of locating a mobile client and discovering or finding other mobile clients who are proximate of a particular mobile user or an arbitrary location. In a broader sense, a "cloud" refers to a grouping of users, or a recursive grouping of other "clouds". A "cloud" is also descriptive of a region, with no absolute defined borders, that moves and changes shape temporally.

The first principle this embodiment is that any kind of fixed database allocation, such as tessellation, which requires tuning and maintenance, will not scale in an environment incorporating millions of mobile users. The invention does not create a fixed tiling scheme. Instead, the technology creates "clouds" that form adaptively in response to user locations. These "clouds" can grow, shrink, and move to accommodate the current number of users in the system.

A "cloud" is a set of mobile users (or other "clouds") whose center is the geometric mean of the MUs (or other "clouds") it contains.

Figure 11:
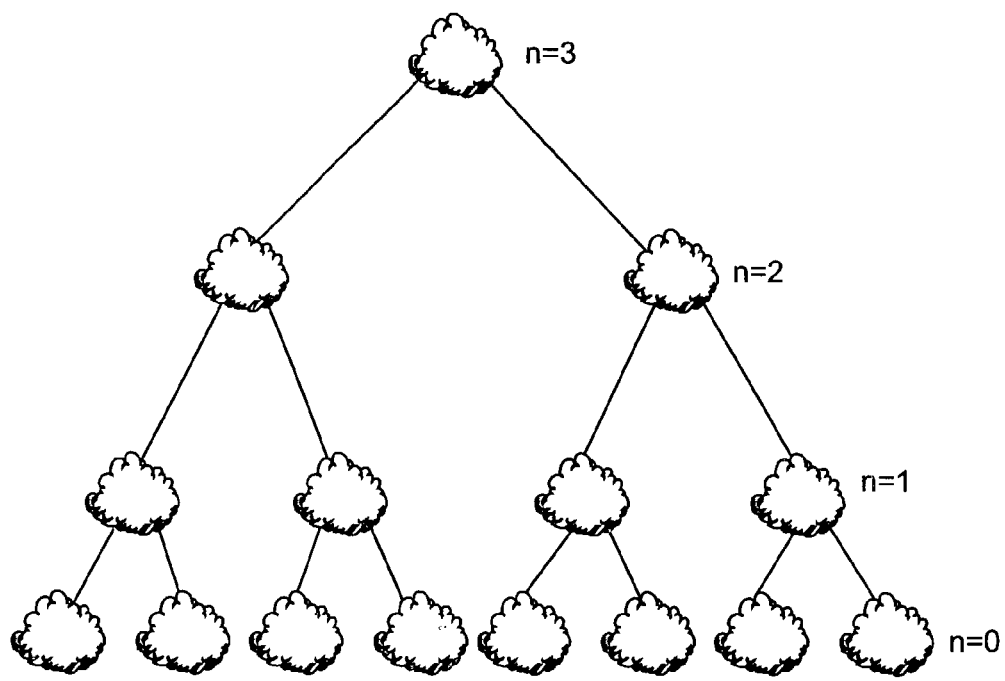
FIG. 11 illustrates a cloud tree according to an embodiment of the invention.

"Clouds" are stored in an N-level tree structure for efficient access and traversal. See FIG. 11. The highest level in the tree is reserved for the root "cloud," whose area is presumed to cover at least the surface area of the earth (or whatever the desired service coverage area happens to be). For purposes of the following approximation, a "cloud" area is assumed to be circular. However, it should be noted that a "cloud" could be in the shape of any polygon or collection of polygons, not just a circle.

Each "cloud" can have C child "clouds" contained within it. When viewed as a tree, this means that each "cloud" can have C children. If C equals 2, then the "cloud" tree is binary.

The total surface area ("A") covered by a single "cloud" at level ("n") can be computed as:

$$A_n = (4/3 * Pi * R_0^2) * C^n$$

$R_0$ is the radius of a "cloud" at level 0, and "n" is the level. For any given coverage area, the required maximum level "n" is a function of the coverage area and the "cloud" radius at level 0.

$$N = \log_C(A/(4/3 * Pi * R^2))$$

Given the surface area of the earth, a one square kilometer "cloud" at level zero, and C=4 (like a quad-tree), the maximum level required is n=14. A "leaf cloud" is a "cloud" whose center is determined by the geometric mean of the MU's contained within it (as opposed to mid-level "the invention" whose center is determined by the locations of its child "clouds").

A linked list of "clouds" (descending from root to leaf) represents a series of concentric "clouds." The largest "cloud" covers the entire surface of the earth at its root. The surface area of the smallest "cloud" (also known as the "leaf cloud") is predetermined by the depth of the tree, and can be arbitrarily small. "Clouds" are dynamically added to the tree as needed. If there are no users in the system, then only the root "cloud" exists.

Figure 12:
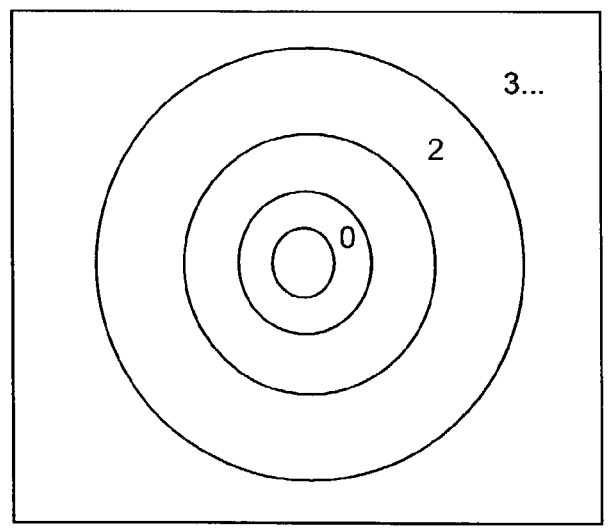
FIG. 12 illustrates concentric clouds with level shown according to an embodiment of the invention.

FIG. 12 illustrates the concentric regions ("clouds") created when a first MU is added to the tree. Note that, for simplicity, "clouds" are shown as concentric circles, and only 4 levels are shown here. The first MU added will simply create a linked list from root to leaf. Note how the "clouds" are all centered at the same point, the location of the MU.

The tree building process continues as subsequent MUs are added. When traversing the tree, the distance from the MU to each child "cloud" center is computed. The closest branch to the closest child "cloud" is followed. At any level, a particular "cloud" will have an approximate radius of Rn.

$$R_n = SQRT(A_n/(4/3 * pi))$$

If the closest child "cloud" is farther than $R_n$ from the MU, a new "cloud" is created and a new branch is formed.

Figure 13:
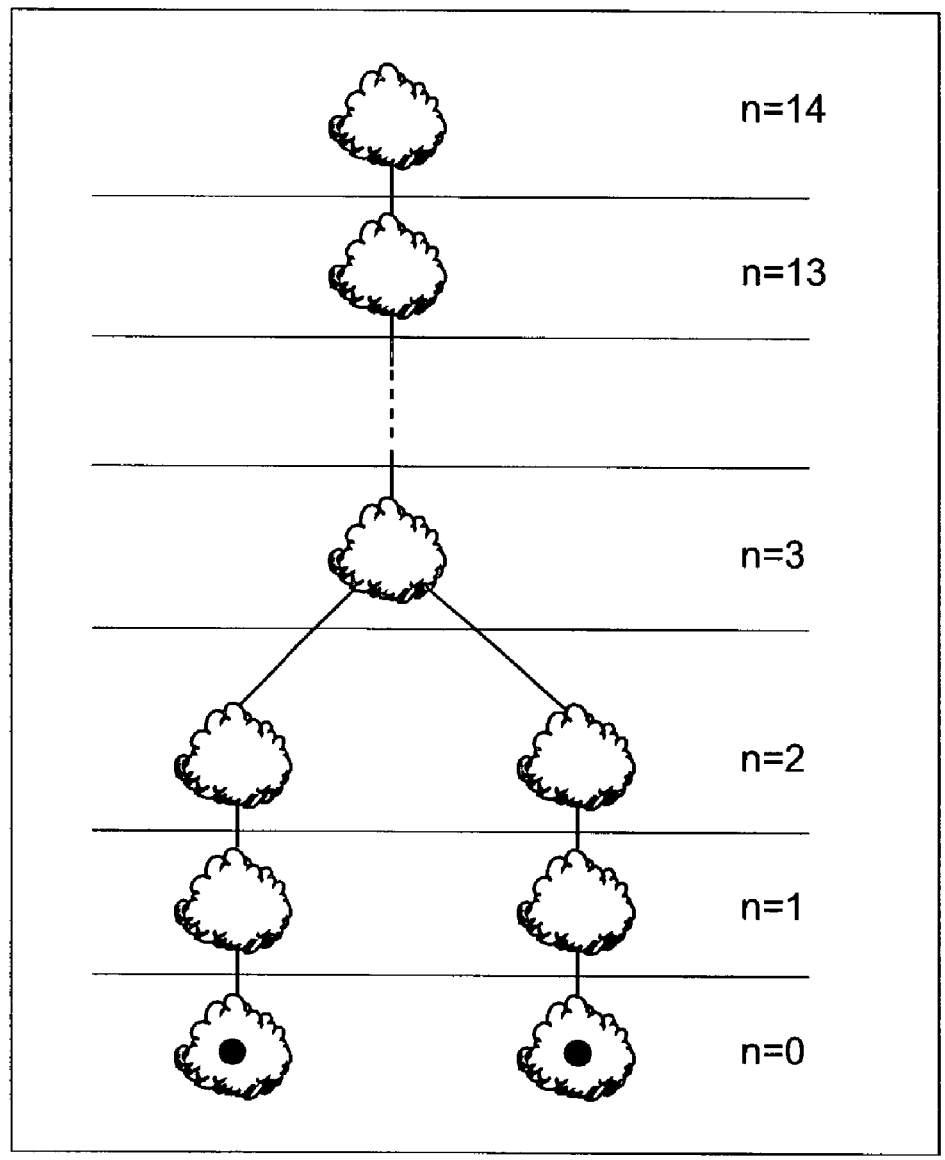
FIG. 13 illustrates building the cloud tree according to an embodiment of the invention.

Consider the case when two MUs are added, one in New York and another in Los Angeles. If the MU in New York is added to an empty tree, it will form a linked list down to level 0. The MU from Los Angeles will start from root and descend until its distance from the nearest "cloud" center is farther than the "cloud" radius $R_n$ at that level. FIG. 13 shows the branching that occurs as the second user added descends the tree. At level 2 the MU does not fall within the radius of the existing "cloud," thus branching.

Figure 14:
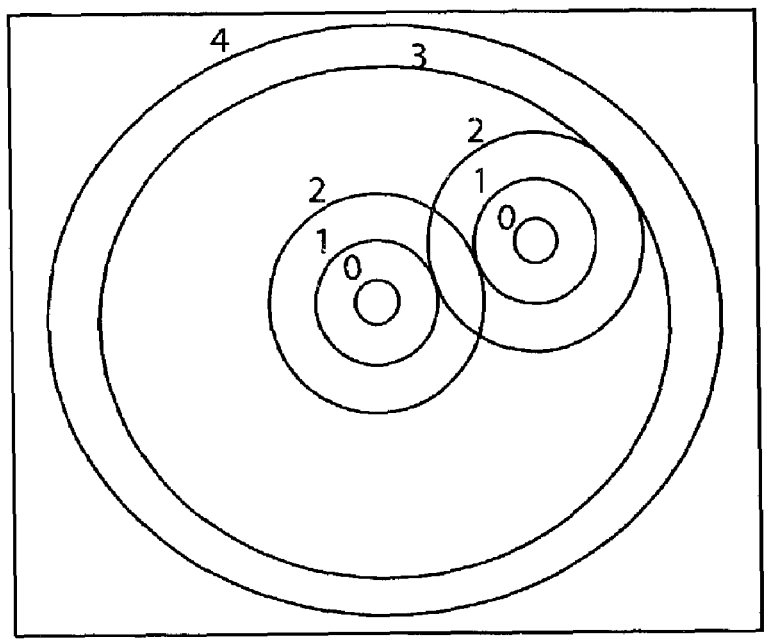
FIG. 14 illustrates a spatial view of cloud structure for 2 MUs according to an embodiment of the invention.
Figure 21:
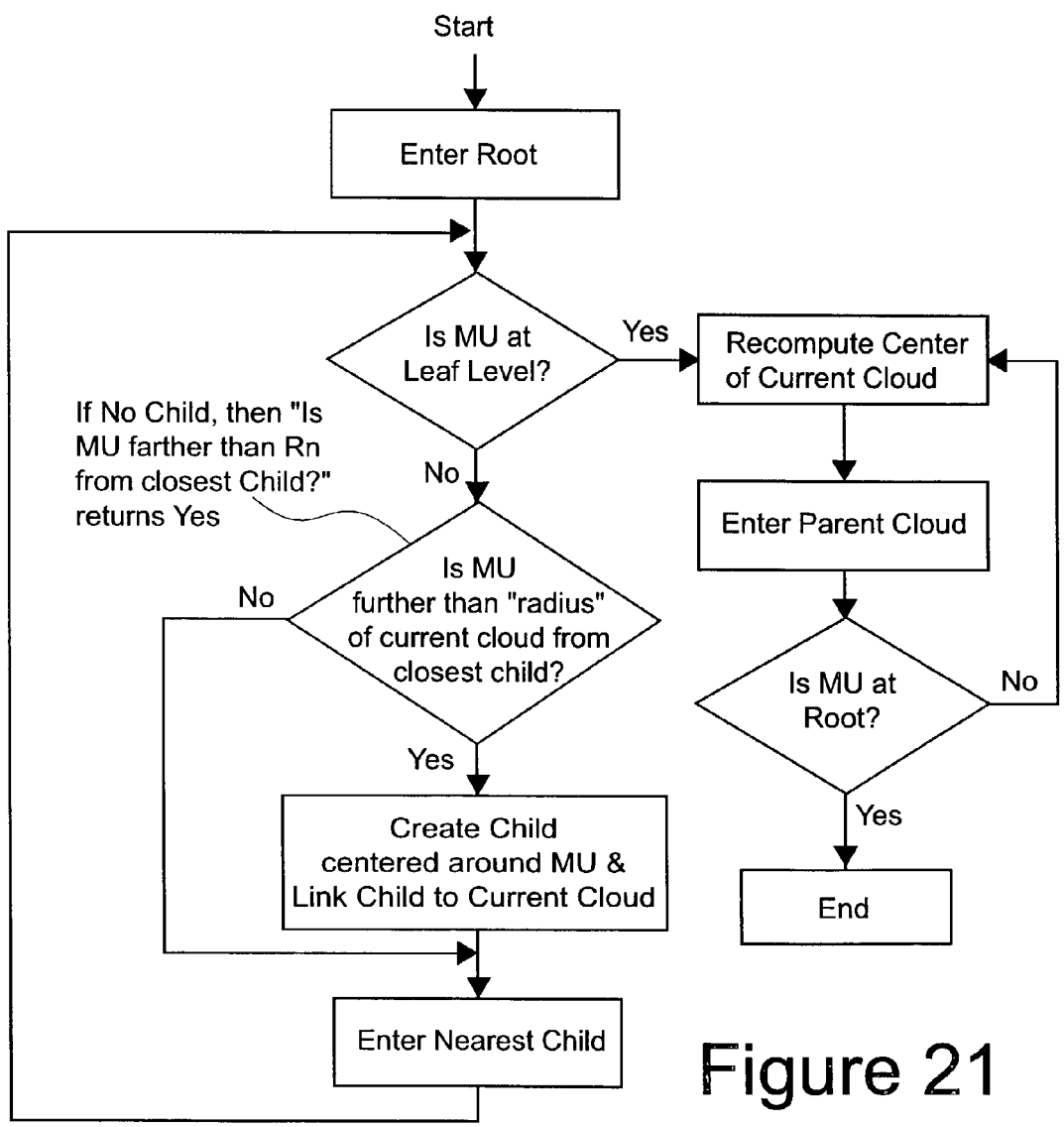
FIG. 21 illustrates an Add MU flowchart according to an embodiment of the invention.

FIG. 14 shows the two separate concentric clouds that exist within the level 3 cloud. FIG. 14 can be thought of as a "top view" of FIG. 13. See the left side of the Add Mobile User Flowchart, FIG. 21.

Following the insertion of an MU into the leaf at level zero, "cloud" centers are recursively re-computed upwards to the root. The recursion begins by re-computing the geometric center of the leaf "cloud." See the right side of the Add Mobile User Flowchart, FIG. 21. This geometric center is re-computed according to the geometric mean of MUs contained in the leaf "cloud." The parent of each "cloud" then recursively re-computes its center. This allows the clouds to dynamically move to maintain a center at the geometric mean of the mobile users it contains.

Figure 15:
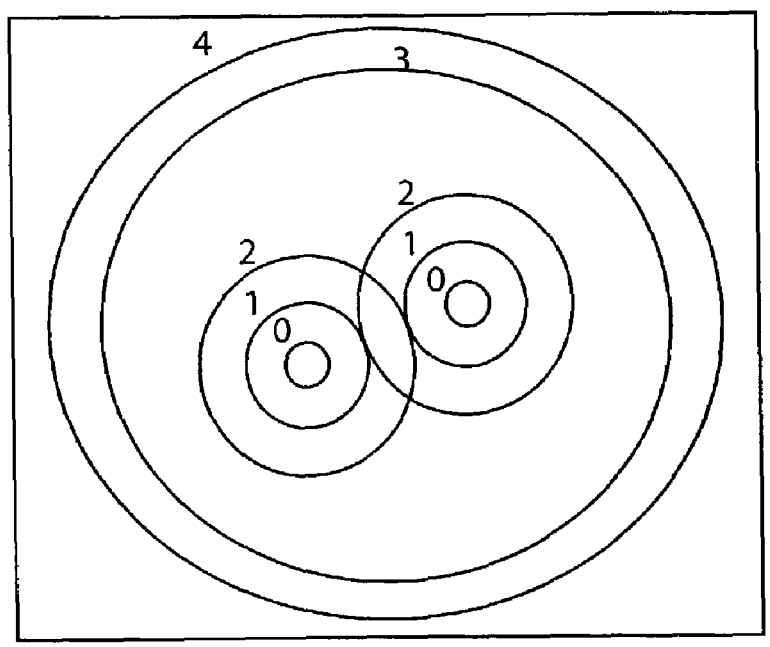
FIG. 15 illustrates recursively re-centered clouds according to an embodiment of the invention.

Following this recursion, all "clouds" will be centered by the geometric mean of their children. FIG. 15 illustrates how "clouds" at level 3 and upwards have re-centered themselves around their children, following the insertion of the user from Los Angeles.

Figure 22:
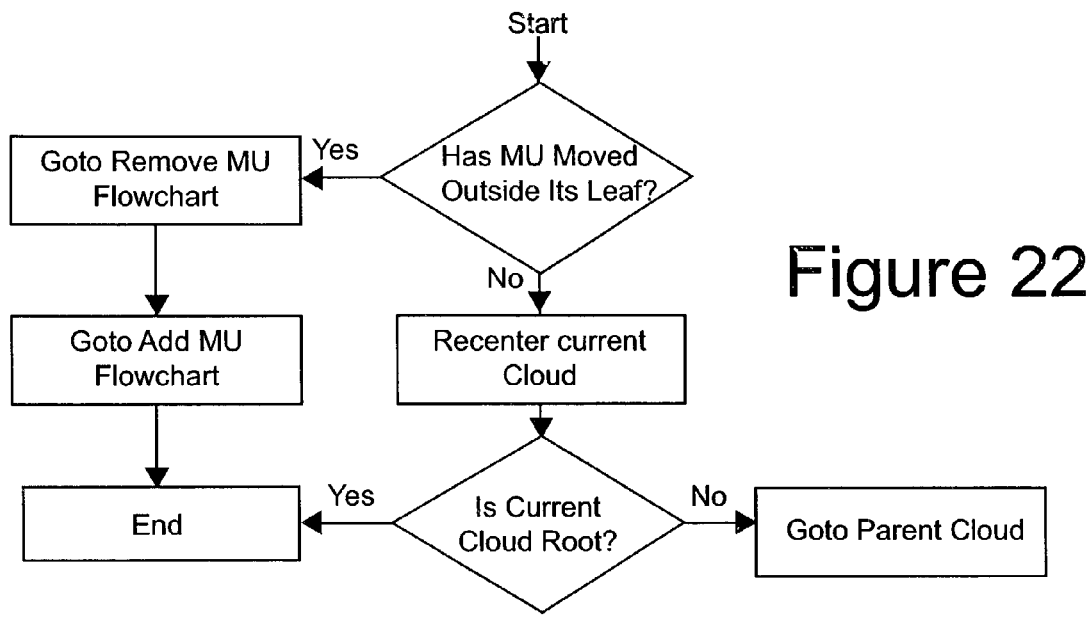
FIG. 22 illustrates a Move MU flowchart according to an embodiment of the invention.
Figure 23:
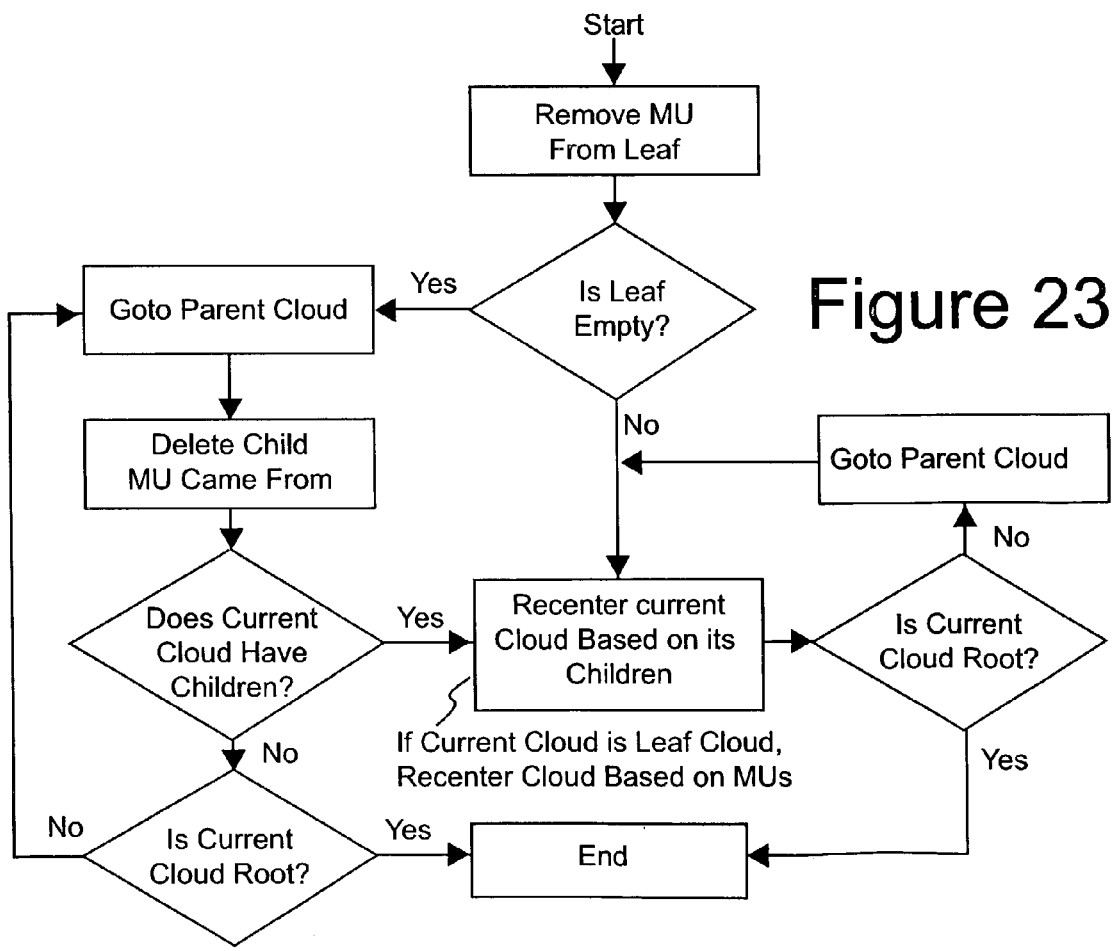
FIG. 23 illustrates a Remove MU flowchart according to an embodiment of the invention.

The purpose of this re-centering is to create an adaptive "cloud" tree whose branches always point directly to the true location of the users. This is similar to a tessellated system that always maintains perfect tessellation with variable sized tiles. The following features of clouds will maximize system resources: "Clouds" are not created where there are no users. Furthermore, each time the position of a user is updated and that user is no longer in the same leaf previously occupied, the user is removed from the previous "cloud" and reinserted into the tree. See Move Mobile User Flowchart, FIG. 22. Moreover, when a leaf "cloud" contains no MU's, a recursive deletion of all unnecessary "clouds" from the tree is triggered and clouds re-center. See Remove Mobile User Flowchart, FIG. 23. These features allow for the maintenance of a highly compact tree.

Figure 16:
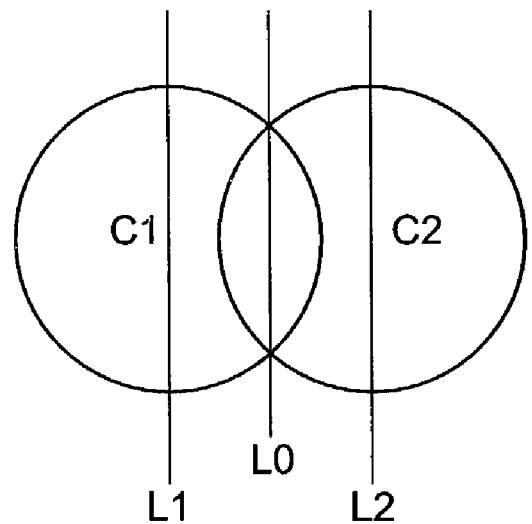
FIG. 16 illustrates initially overlapping clouds according to an embodiment of the invention.

A very important consideration is that the two "clouds" at level 2 actually overlap, as shown in FIG. 14. This implies that tile packing is not strictly enforced as with tessellation. Consequently, there is no hard limit on the number of children that any "cloud" can have. However, given a uniform distribution of users, a thought experiment will show that the "clouds" will eventually optimally pack the space of the parent "cloud" in the most efficient manner. FIG. 15 and FIG. 16 illustrate this concept.

Figure 17:
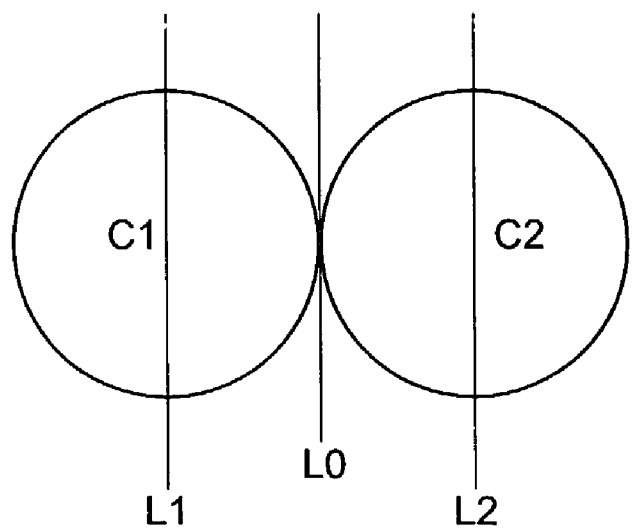
FIG. 17 illustrates clouds re-centered and optimally packed according to an embodiment of the invention.

Consider two overlapping "clouds" with centers C1 and C2 that have formed in a region where user population is uniformly distributed in both dimensions. See FIG. 16. Subsequent users falling within C1 and to the left of L0 will join "cloud" 1 because they are closer to its center than to the center of "cloud" 2 (C2). Likewise, users falling to the right of L0 will join C2. We will now take a closer look at C1. If we assume an even distribution of users, then as many users falling inside circle 1 will fall to the left of L1 as fall to the right of L1. However, more users will actually "join" C1 to the left of L1 than "join" to the right of L1. This occurs because there is more surface area in which an MU can join C1 to the left of L1 than to the right. Remember that a portion of the MUs falling within C1 to the right of L1 will join C2. Because the center of a "cloud" is recomputed each time a user is added, the center of the "cloud" will migrate away from an overlapping cloud. The "clouds" will move apart until they no longer overlap as shown in FIG. 17.

Figure 18:
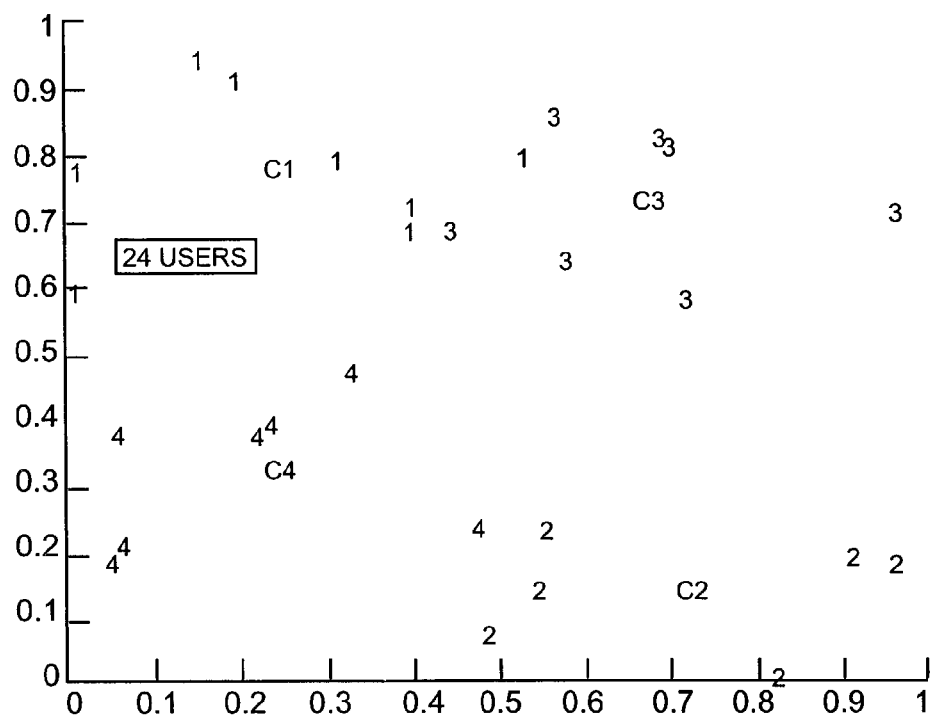
FIG. 18 illustrates a simulation according to an embodiment of the invention.

This process has been verified by simulation. FIG. 18 shows an arbitrary 2 dimensional region with normalized extents. The region began with no users. Users joined at simulation time intervals and exited at a random time later. The simulation is set so that the service rate is slower than the arrival rate so the region fills (standard queuing theory). For this simulation, a normalized "cloud" radius of $R_0=0.5$ was chosen. Note that early in the simulation, four "clouds" had quickly formed, as represented by "clouds" centers C1, C2, C3, and C4. Users that had joined C1 are indicated with the number 1, users that had joined C2 are indicated with the number 2, and so on.

Figure 19:
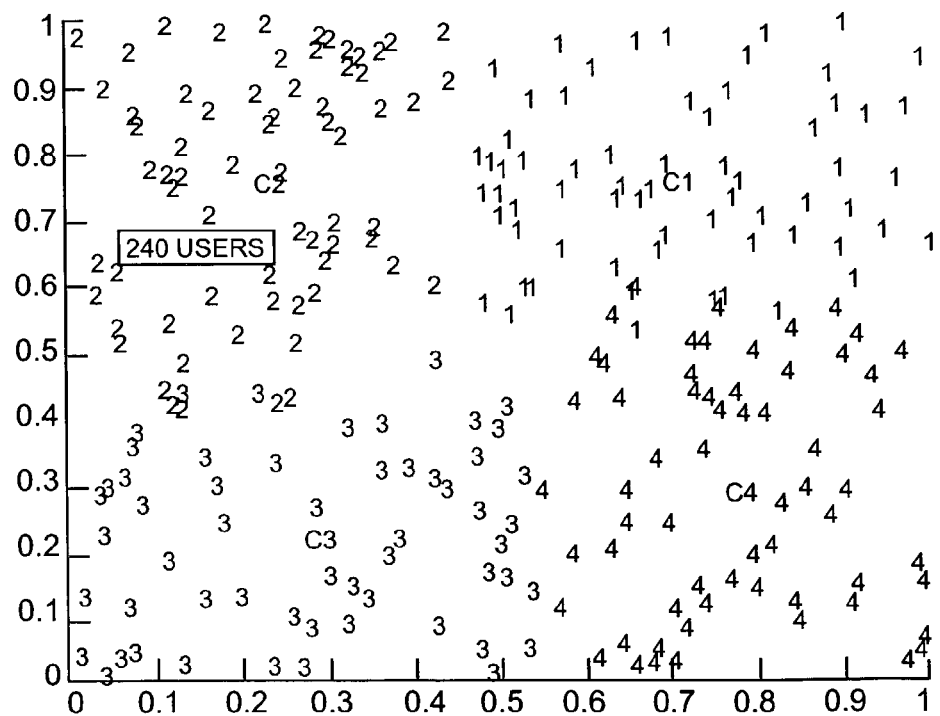
FIG. 19 illustrates a simulation according to an embodiment of the invention.

Notice that as the simulation progressed, the geometric centers of the "clouds" exactly shift to optimally pack the region. FIG. 19 shows the result of the same clouds simulation after running for a longer time period. Notice that C1, C2, C3, C4 have formed in slightly different regions from the previous observation. Also note that the centers have converged towards (0.25, 0.25), (0.25, 0.75), (0.75, 0.25), and (0.75, 0.75). The centers are actually constantly moving so as to optimally pack the space existing between users and between "clouds."

It is important to note that while four centers have formed in this simulation, if we had used a smaller $R_0$, more "cloud" centers would have formed, each with a smaller radius.

A main attribute of the invetive technology and the "cloud" tree architecture is to provide the fastest possible way to search, identify and locate a mobile user and/or group of mobile users that are proximate to a particular MU or specific geographic point of interest.

Consider a proximity-based advertising system requesting to send 100 advertisements to mobile users located within one kilometer of a specific store in Roponji, Tokyo. The advertising application would begin its MU search at the root "cloud." The "cloud" descent algorithm is then used to find "clouds" within a desired distance $R_n$ from that store. Very often, the query center will be located close to the center of a "cloud" and the MUs in the "cloud" will surround the query center. Under this scenario, the query center will be found inside a leaf "cloud." To optimize the query results, the application can simply choose to select an arbitrary subset of users in the leaf "cloud." This scenario is shown in FIG. 20A.

Figures 20A, 20B:
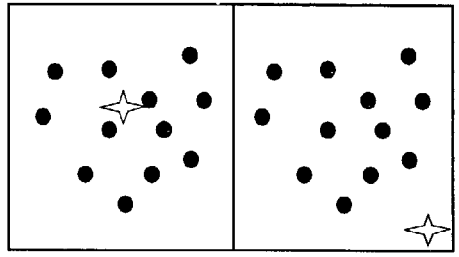
FIG. 20A illustrates a Query Center in Center of Leaf "Cloud" according to an embodiment of the invention.
FIG. 20B illustrates a Query Center Not in Center of Leaf "Cloud" according to an embodiment of the invention.

In other cases the descent will simply end at a level where the store is not inside but the nearest to leaf "cloud." This case situation, shown in FIG. 20B, shows that MUs inside the "cloud" would generally be on one side of the query center as opposed to surrounding it. If the application desires a true within distance search of a particular radius, the application simply navigates one level up the tree to re-obtain the list of peer leaf "clouds." Starting with the nearest peer leaf, the application performs within distance querying inside the peer leaves, discarding MUs that fall outside the radius.

In practice, a "cloud" containing too many MUs would result in unacceptably long query times. While "too many" may sound vague, in practice there is no hard limit. The notion of "too many" is simply a function of computer processing power, network delays, memory I/O bandwidth, and so on. Therefore, "clouds" themselves determine when they have become full based not on a hard MU limit, but based upon their own response time to queries.

When a leaf "cloud" fills, and if subsequent MUs attempt to join the "cloud," the request will be denied and a new, "stacked" (i.e., overlapping) "cloud" will be formed.

When a new "cloud" is formed in response to a fall "cloud," the new "cloud" may partially or fully overlap the previous "cloud." Such a scenario may occur at a large sporting event, a popular nightclub district, or a very highly populated region where thousands of users converge on the same area.

Concurrent "clouds" permit within distance queries to be performed in parallel, allowing the entire density to be within distance queried with the same latency as a single "cloud" query.

Figure 24:
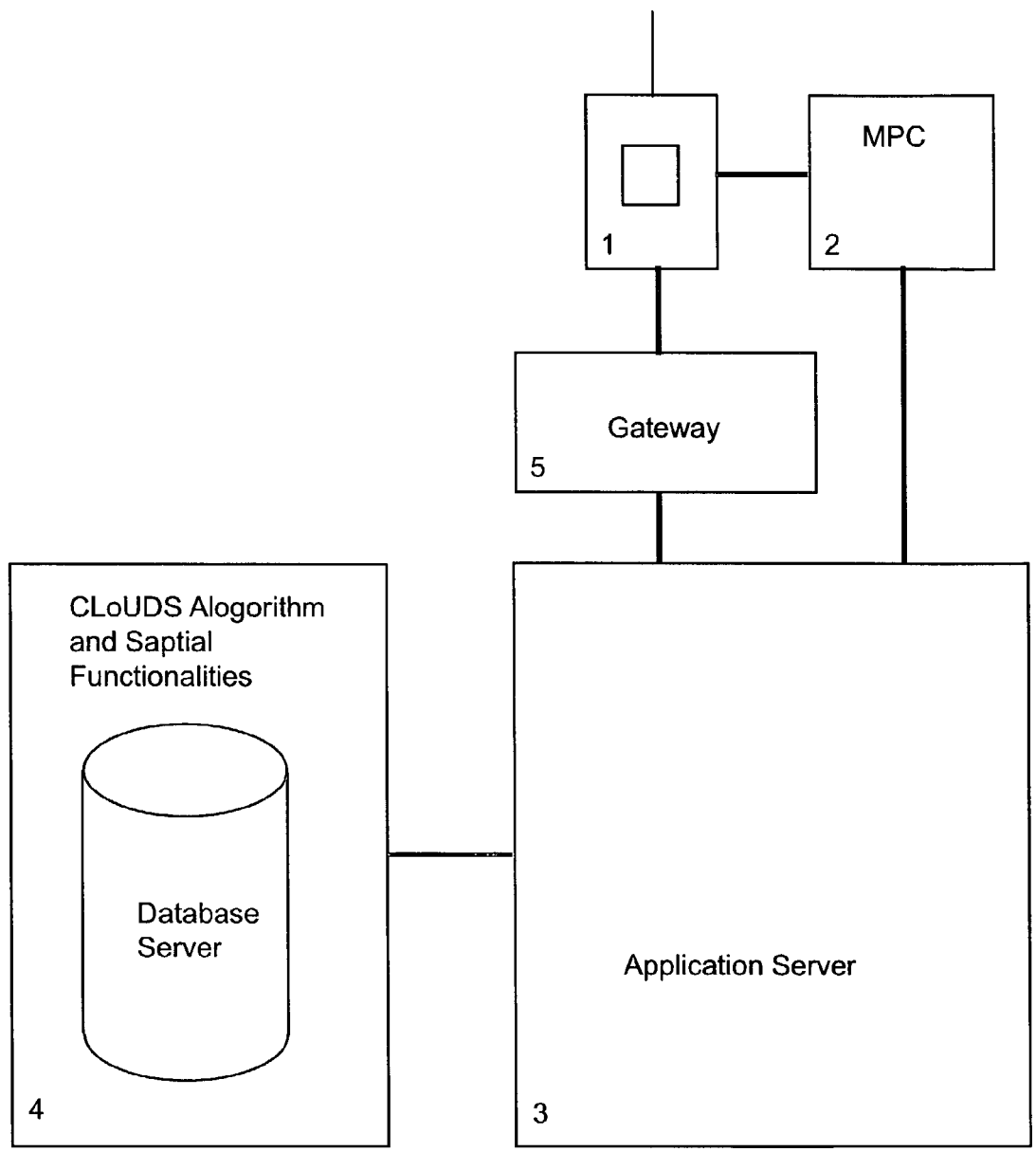
FIG. 24 illustrates a Block diagram of a system according to an embodiment of the invention.

With reference to FIG. 24, a mobile unit 1 (consisting of a processor, internal memory, an input device, and a display device) has radio transmission and reception functionalities (typically a laptop computer, a PDA, or a cellular phone capable of sending and receiving radio waves to exchange information). A Mobile Positioning Center (MPC) 2 obtains the location data for MUs 1 and publishes this data to other machines. An Application Server 3 is capable of obtaining and processing data from one or more MPCs.

A system 4 comprises a database with an implementation of the clouds algorithm. The system consists of at least a processor and permanent and volatile memories. Additional spatial functionalities can be implemented on this system. The database and the clouds algorithm can be stored on the permanent memory, such as on magnetic or optical disk drives. A gateway computer 5 acts as an intermediary between a MU and the Application Server 3 when an MU requests services or applications from the Application Server. This machine is capable of formatting data in a representation that the MU understands. An MU will send its requests for services to the Gateway computer 5, which will act on behalf of the MU for service requests and replies to the Application Server. The Gateway 5 will then format the reply for the MU.

The inventive principles comprise a spatial management method and system that is designed to store and maintain moving point data. The invention algorithm is efficient, adaptive, and easily implemented independent of a particular RDBMS. The invention is self-optimizing and free of maintenance and tuning. The invention can scale to store the locations of millions of mobile users and can provide fast within-distance querying regardless of the number of mobile users in the system.

In another embodiment of the invention, a computer architecture is provided to locate a MU and find other nearby MUs or SU's in a location-aware telecommunications environment. As used herein, a mobile telecommunications unit (MU) is a mobile telecommunications transmitter, transceiver, receiver, or the like, capable of supporting a wireless connection, whether used for data or voice communications. Examples include, but are not limited to, cell phones, pagers, wireless web browsers, personal digital assistants, and laptop, handheld, and wearable computers. The operator of the MU is referred to as the user. A stationary unit (SU) is any conventional hard-wired telecommunications device or other non-portable device that might otherwise be considered an MU. A telecommunications unit (TU) is either a MU or a SU.

Figure 1:
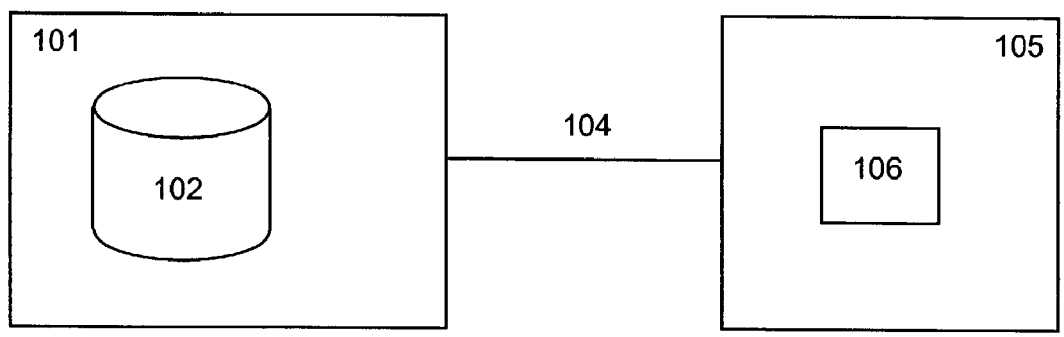
FIG. 1 illustrates a general architecture that may be used for managing moving point data according to an embodiment of the invention.
Figure 1:
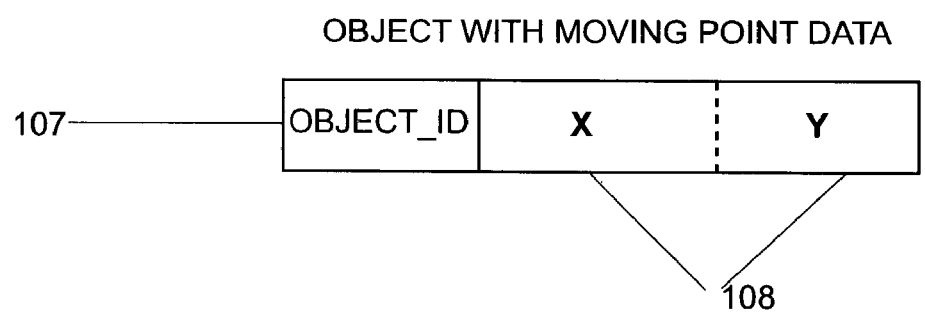

Referring to FIG. 1, a diagram of a system incorporating aspects of this invention is shown. This computer architecture consists of a moving point server 105, an API 103 that stores instructions for accessing the moving point data 106 stored on the moving point server 105, and a database server 101 that stores non-moving point data in a database 102. A database server 101 may be provided to store attribute data about MUs in the system. For example, an MU may in this case be a mobile telephone. For each MU, the attribute data stored on the database server 101 may include the phone number of the MU, the name of the person who owns the MU, an address for the owner, information about the MU owner's calling plan, the user's business type, or any other information demographically related to that user. The data stored in the database server 101 is generally static or non-moving point data in that it is not typically updated frequently. In addition, the database server 101 may also run applications that receive data from MUs making requests for data stored in the database server 101 and the moving point server 105.

Connected to the database server 101 is an interface 103 that contains stored instructions that allow it to communicate with the moving point server 105. Interface 103 may be embodied in a variety of forms. For example, interface 103 may be an API, as is known in the art. Interface 103 may be a custom piece of software created to bridge the database server and the moving point server. Alternatively, it may be a commercial implementation such as an Informix virtual table interface (VTI). Interface 103 may store instructions for connecting database server 101 to moving point server 105. Interface 103 may be connected to moving point server 105 by a reliable connection 104 such as a TCP socket connection, or some other reliable connection, as is known in the art, such as a serial connection or point-to-point connection.

Moving point server 105 stores moving point data 106. Moving point data is any data ordered in the form of records that are updated frequently. Moving point data is made up of identifying data 107 and non-identifying data 108. Identifying data 107 is data that uniquely identifies a particular record or object. An example of identifying data is a primary key in a database record. Non-identifying data 108 is data that cannot be used to uniquely identify a record or object. For example, a MU changes locations frequently as it moves or is moved within the telecommunications network. Data representing the moving MU's location is non-identifying data 108 because multiple MU's may be at the same location. Data representing the unique identity of that particular MU is identifying data 107. In a location-aware telecommunications unit, a change in location may result in a change in the non-identifying data 108 of an object representing an MU. Moving point data 106 is generally changed frequently in order to be useful. That is, in the example of the MU moving throughout the telecommunications network, the moving point data 106 (specifically the non-identifying data 108) should be current to produce accurate results. In some aspects of the invention, this moving point data 106 consists of objects representing MUs. These objects include identifying data that may consist of a unique object identifier that identifies the MU, and non-identifying data made up of a set of coordinate values that represent the location of that MU. The object identifier may be commonly understandable to each of database server 101 and moving point server 105. The coordinates may consist of GPS coordinates, UTM coordinates, or other location identifying data as is known in the art. Interface 103 may include instructions that allow moving point server 105 to associate moving point data 106 with non-moving point data stored in database server 101.

Moving point data 106 may be stored on moving point server 105. In some embodiments, this data is stored in a datastore in active memory such as DRAM. Moving point server 105 may be a computer that is separate from the other parts of the computer architecture. This server may, however, also reside on the same machine as interface 103 and database server 102, provided that its datastore is separable and/or distinct from database 101 that stores the non-moving point data. In some aspects of the invention, the datastore may consist of a grouping of tree structures, linked lists, and arrays. However, as one skilled in the art can appreciate, it is possible to use other kinds of data storage techniques and combinations of data structures in order to efficiently keep the moving point data in active memory.

Moving Point Server

In one embodiment, the moving point server holds a datastore comprising at least three data structures. The first data structure is used to maintain an index of objects based upon their identifying data 107. Typically the first data structure stores identifying data 107. This identifying data may be an object identifier or a key value in a database. The second data structure may be used to store non-identifying data 108. A purpose of the second data structure is to store the non-identifying data in such a way that for a given object record (for example an MU), those object records with similar (but not necessarily identical) non-identifying data can be easily located and referenced. In some embodiments the second data structure is a quad-tree that stores non-identifying data 107 in the form of location coordinate pairs. The third data structure may be used for tying the first and second data structures together. There may, however, be several data structures that tie the first and second data structure together. In one embodiment the third set of data structures consist of linked lists of objects. Both identifying data 107 and non-identifying data 108 may be stored in these linked lists of objects.

First Data Structure—Object Handler

Figure 2:
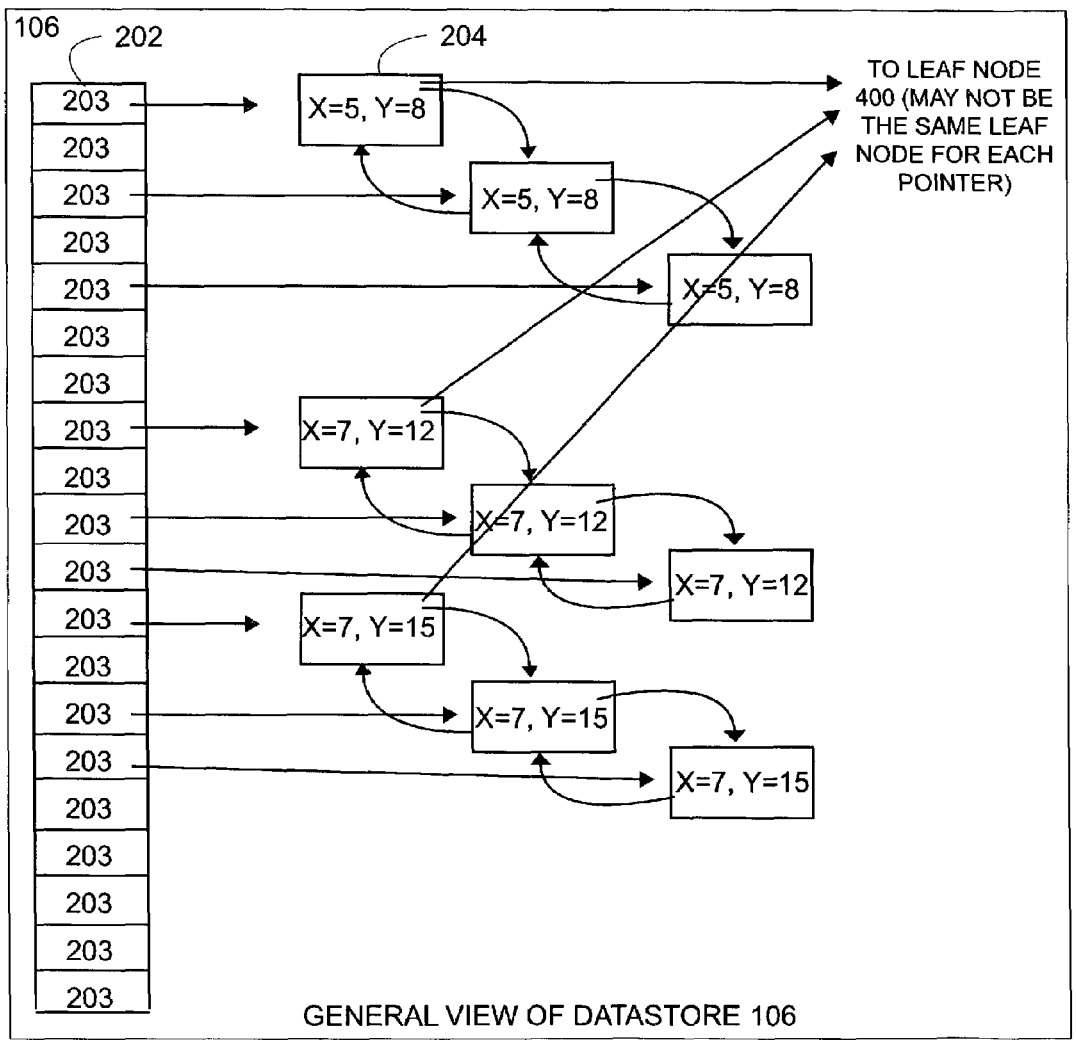
FIG. 2 illustrates a detailed view of a moving point server shown in FIG. 1.

Referring the FIG. 2, datastore 106 contains a first data structure in the form of an object handler 202. Object handler 202 may be an array, a linked list, or some other data structure as is known in the art. Object handler 202 may be made up of individual cells 203. In some embodiments of the invention, each cell 203 in the object handler represents an MU that is already stored in the system. FIG. 2A illustrates an example of this array. Each cell may contain an object identifier 211 that is used to relate this data to a particular MU record on database server 102. Each cell may also contain an object pointer 212 to an object descriptor record that is part of the second type of data structure described above. This object identifier might not contain the same identifying value as its related record on the database server. The object identifier need only provide enough information so that the system, when communicating between database server 102 and moving point server 105, may ascertain that a cell 203 in object handler 202 is referring to a particular MU record stored on database server 102.

Second Data Structure—Location Store

With reference to FIG. 3, tree structure 300 may be used to store location coordinates or other non-identifying data. The tree structure 300 may store identifying data as well in addition to the non-identifying data. Each node in the tree may have as few as two branches (also called children), or as many as several dozen (or more). Data may be stored in leaf nodes. However, one of skill in the art might easily envision an embodiment where moving point data is also stored in non-leaf nodes. The tree's starting point (node without any parents) is referred to as the root. In one embodiment tree structure 300 is a quad-tree. However, it can be appreciated by one skilled in the art that another type of tree structure may alternatively be used, such as a binary tree, an oct-tree (for more precise three-dimensional location data), a KD-tree, or some other tree structure. Quad-tree structure 300 has root node 302. If root node 302 is the only node in the tree, then that node is also a leaf node and stores moving point data. As the tree grows, non-leaf nodes are created, as will be described below.

Figure 4:
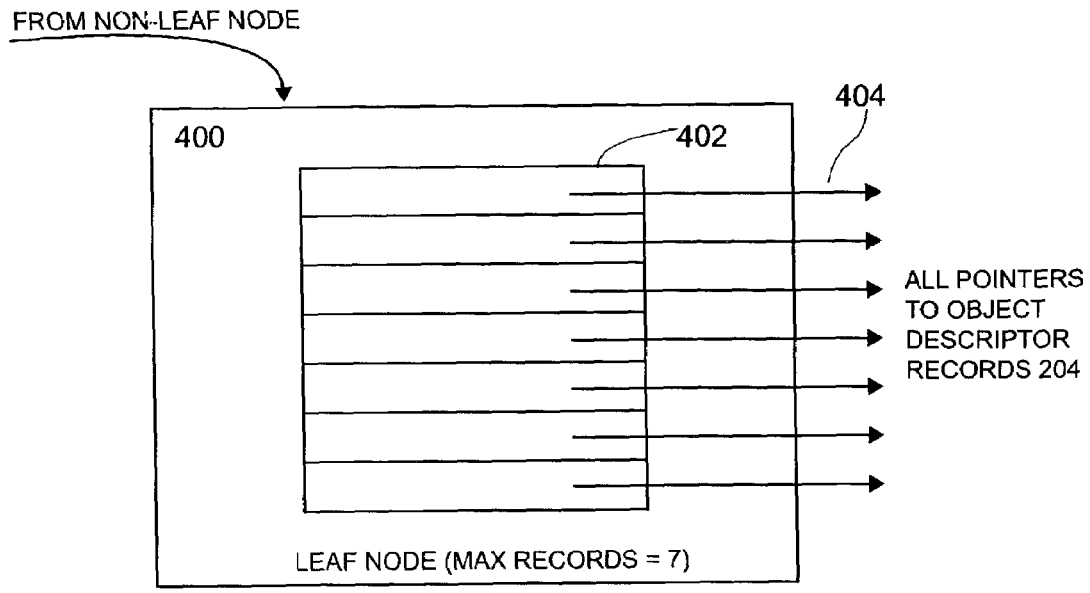
FIG. 4 illustrates a detailed view of a leaf node in the tree structure shown in FIG. 3.
Figure 5A:
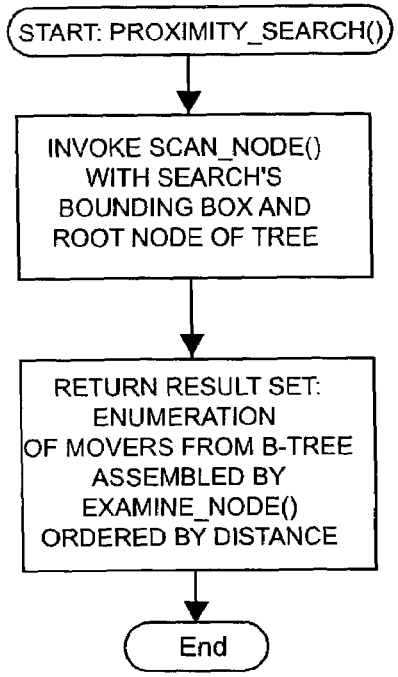
FIG. 5A illustrates steps of a proximity search according to an embodiment of the invention.
Figure 5B:
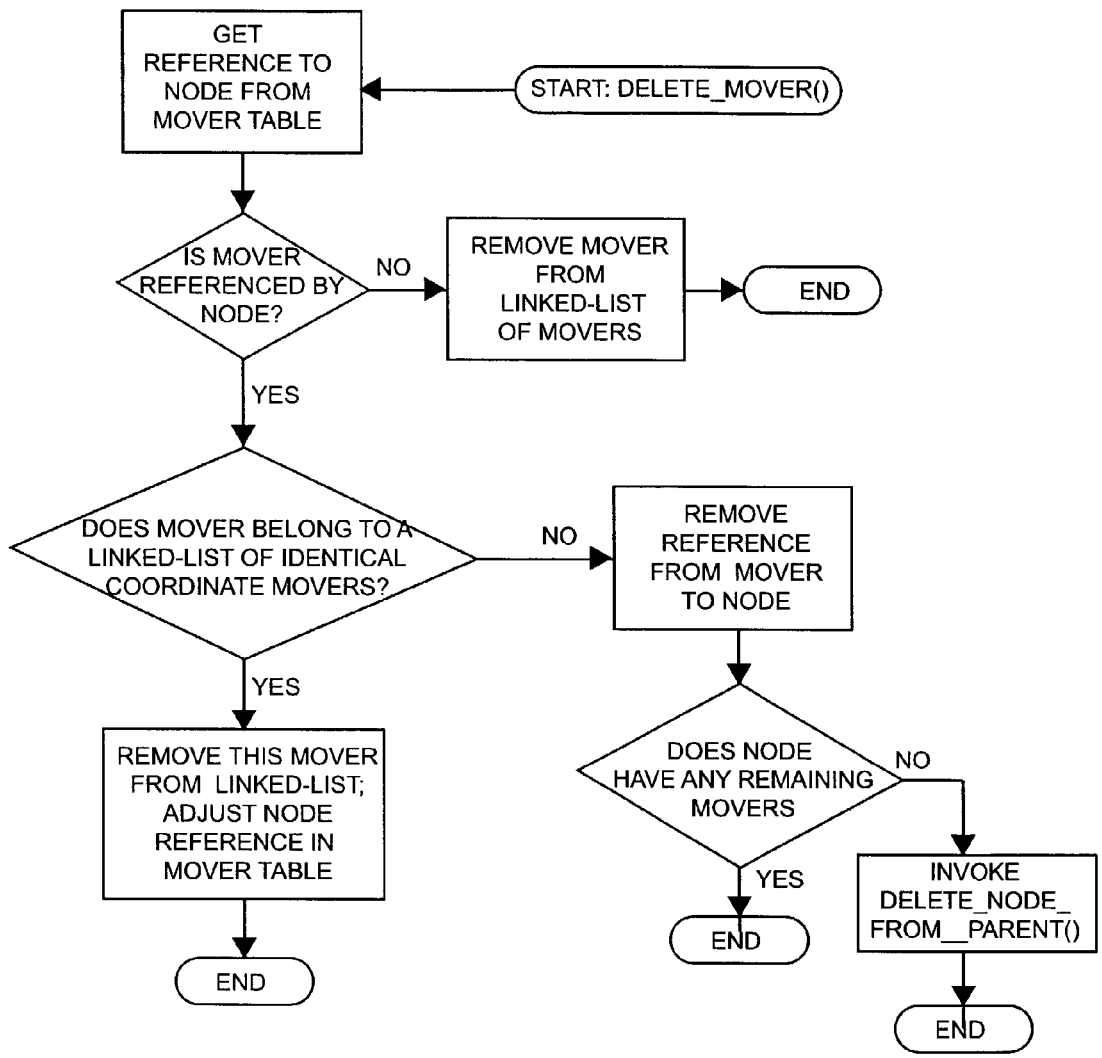
FIG. 5B illustrates steps of a delete mover routine according to an embodiment of the invention.
Figure 5C:
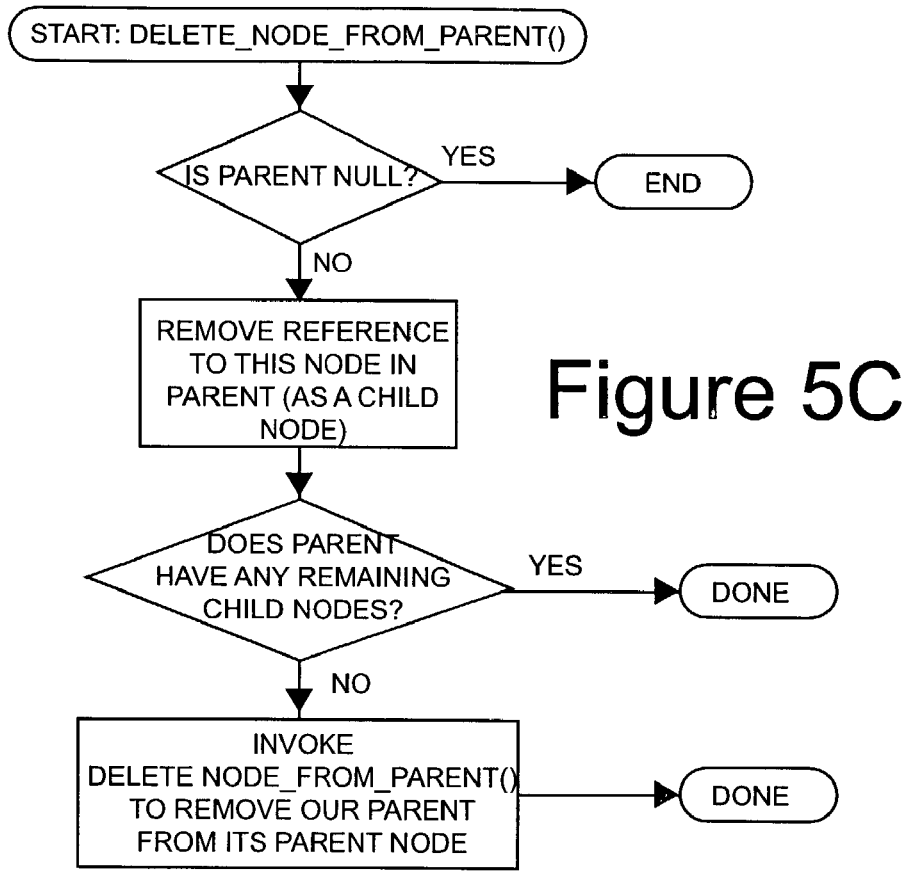
FIG. 5C illustrates steps of a delete node from parent routine according to an embodiment of the invention.
Figure 5D:
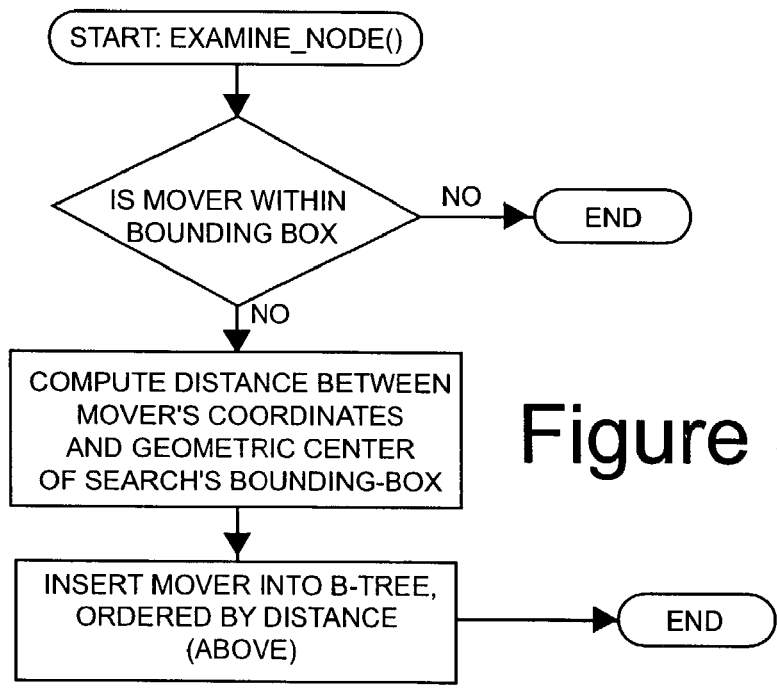
FIG. 5D illustrates steps of an examine node routine according to an embodiment of the invention.
Figure 5E:
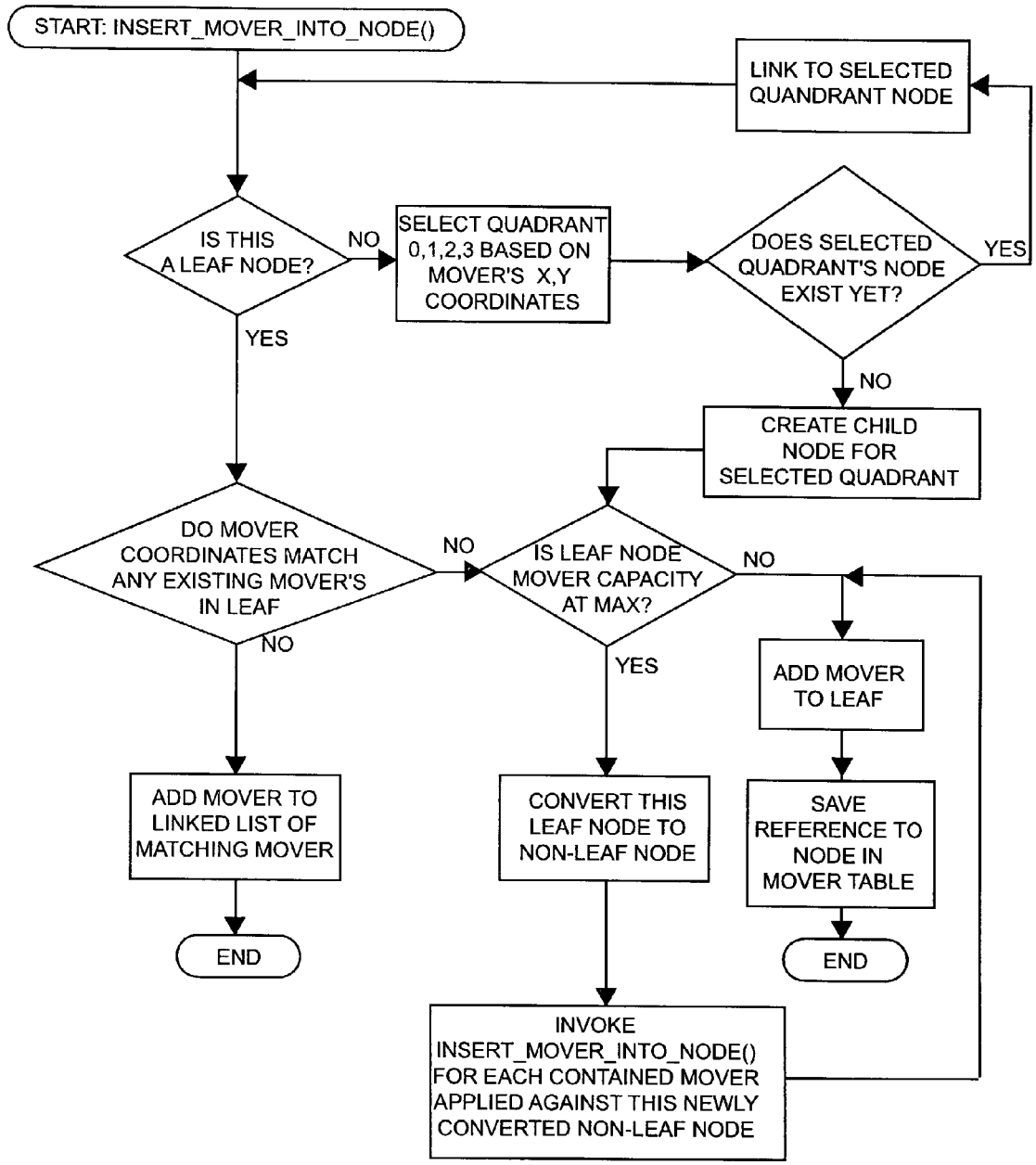
FIG. 5E illustrates steps of an insert mover into node routine according to an embodiment of the invention.
Figure 5F:
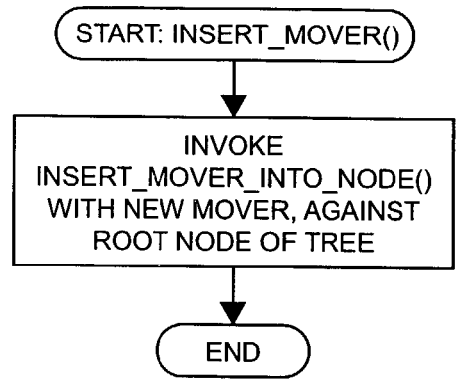
FIG. 5F illustrates steps of an insert mover routine according to an embodiment of the invention.
Figure 5G:
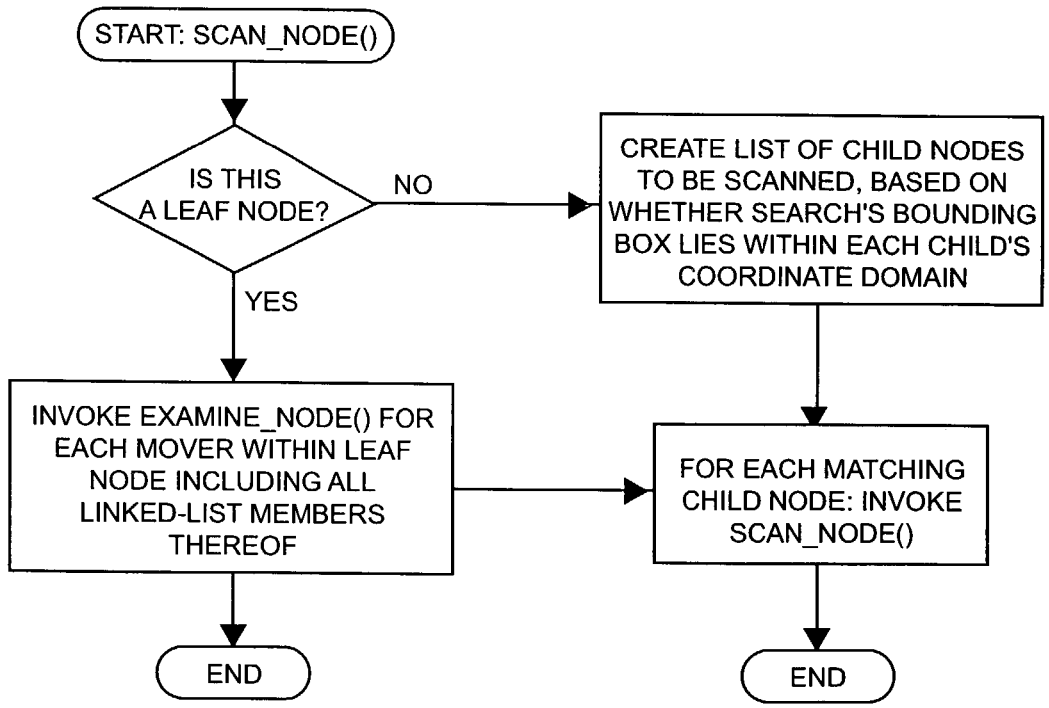
FIG. 5G illustrates steps of a scan node routine according to an embodiment of the invention.

Referring to FIG. 4, an example of a leaf node 400 is shown. As previously discussed, leaf nodes differ from non-leaf nodes in that they may contain a data structure (or container) in which may be stored references to object descriptor records. The container 402 within leaf node 400 may be an array, a linked list, or some other data structure known in the art. In one embodiment, container 402 is an array of pointers 404 to object descriptor records 204 stored on moving point server 105. This array may be limited in size, i.e. it may contain a limited number of pointer records.

Building the Location Store

An advantage of the inventive system is the ability for the architecture to quickly grow, yet maintain a stable rate of performance throughout that growth. Moreover, as the number of objects on the moving point server increases, the granularity of proximity searches continually improves. Consider an example where the datastore located on the moving point server is empty. The object handler has been created but has no records in it, since no records are in the object handler there are no object descriptor records, and the quad-tree has only a root record. Assume further that the location-aware telecommunications network is set up so that it receives location data from MUs every fifteen minutes (or other predetermined amount of time). The location measurements received by the network will have a specific granularity, or degree of physical accuracy, e.g., location specificity to within 100 square feet. There are millions of possible location coordinates that could be received into the system. Storing each location coordinate in advance would constitute a considerable waste of resources. One aspect of the present invention alleviates this need by not creating a location record until a location appears in the system (i.e., an MU report being at that location).

One possible negative consequence of not creating a location record in the datastore until that particular location appears in the system is that when the datastore contains only a few records, the granularity of the proximity searches will not be high, because fewer nodes will have been created in the quad-tree. Recall that the leaf nodes of the quad-tree are converted to non-leaf nodes when the container within the leaf is completely filled with (or exceeds maximum capacity of) records. Therefore, as the datastore is built, it will originally have only a leaf node in which all locations are stored. A proximity search in this case might return a number of records not close to the MU requesting the data. This possible problem is quickly alleviated in a location-aware telecommunications network that frequently (for example, every fifteen minutes) receives location data from MUs. In such a network, the quad-tree will grow quickly (dependent upon the size of the container within each leaf node). This growth will lead to location coordinate pairs that are different (but in the same leaf node) being separated into one of four child nodes as each leaf node "outgrows" its container. This separation results in more closely aligned coordinate pairs in leaf node containers.

Figures 6, 7:
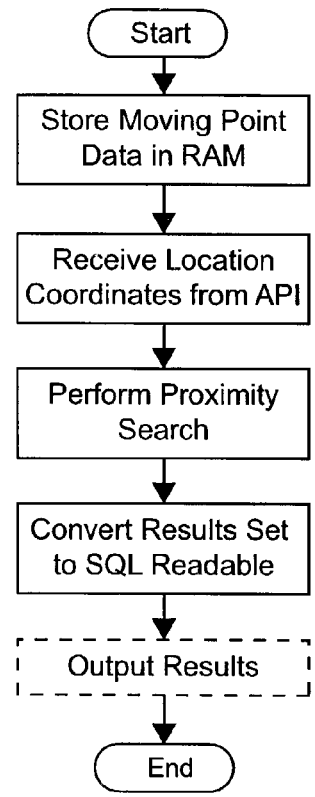
FIG. 6 illustrates a flow chart of steps for managing moving point data according to an embodiment of the invention.
FIG. 7 illustrates a leaf node of the tree structure populated with location coordinate data.
Figure 8:
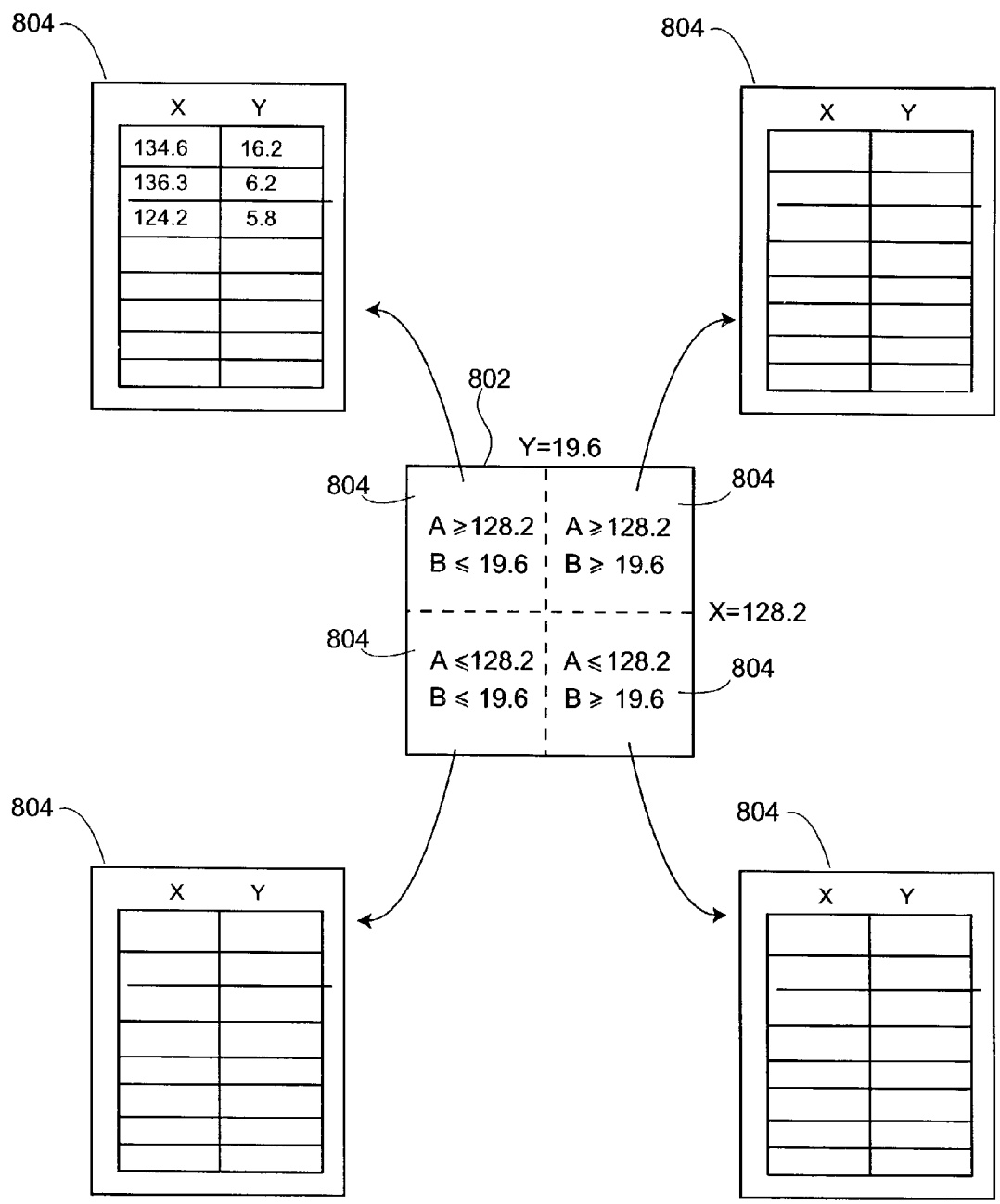
FIG. 8 illustrates a flow chart of a method for converting a leaf node to a non-leaf node.
Figure 9:
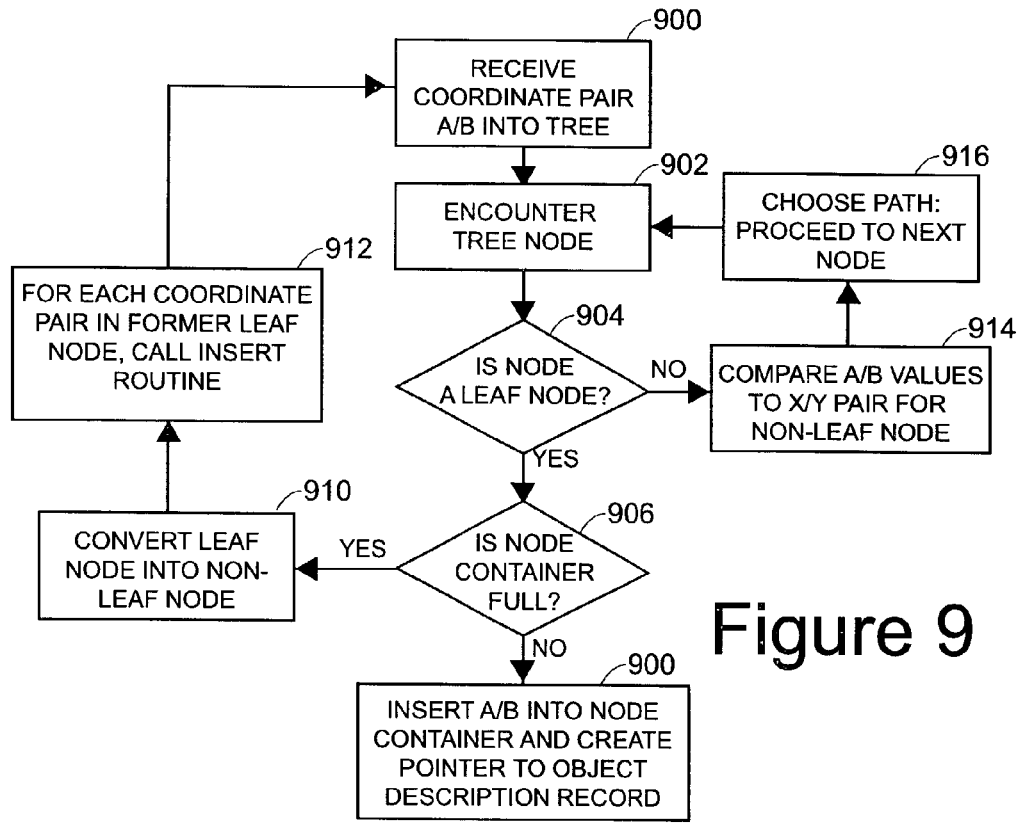
FIG. 9 illustrates a flow chart of a method for adding data into a quad-tree structure.

The process of changing a leaf node to a non-leaf node as a result of a filled container is illustrated in FIGS. 7, 8, and 9. Assume that the maximum number of records in a container in a leaf node has been set to nine. FIG. 7 illustrates such a leaf node 702, its container 704 populated with 9 record entries of X/Y coordinates. These entries may be actual coordinates as shown in FIG. 7, or they may be pointers to object descriptor records that contain X/Y coordinates.

When a new set of object coordinates 706, for example A/B, are received into the tree, a control application in the moving point server traverses the tree in order to find the proper leaf node in which the coordinate data should be inserted. When a node is encountered in step 902, the node is checked to determine whether it is a leaf or non-leaf node in step 904. If the encountered node is a leaf node, then another determination must be made in step 906: is the node container full? If not, then in step 908 the new coordinates A/B are inserted into the node container and a pointer is created that references the object descriptor record that corresponds to these coordinates. If the node container is full, then the leaf node is converted to a non-leaf node in step 910. (This step will be more fully described below.) After the conversion from leaf node to non-leaf node, in step 912, each coordinate pair that was in the leaf node container is added back into the tree by calling this same insertion routine starting at step 900. If a node is encountered in step 902 and step 904 determines that it is not a leaf node, the A/B values must be compared to the X/Y coordinate pair in the encountered non-leaf node (step 914). Referring back to FIG. 3, each non-leaf node 304 has four branches which lead to child nodes. To illustrate, assume that we call the branches Branch_1, Branch_2, Branch_3, and Branch_4. The following formula will dictate which of the four possible child nodes will be followed:

Where A>=X and B<Y, follow Branch_1,
where A>=X and B>=Y, follow Branch_2,
where A<X and B<Y, follow Branch_3, and
where A<X and B>=Y, follow Branch_4.
where X and Y represent a pair of location coordinates.

Once the path is chosen to proceed to the next node in step 916, the process repeats itself by going back to step 902 where it encounters a tree node.

Converting a Non-Leaf Node to a Leaf Node

Referring again to FIG. 7, assume that the received location coordinates have traversed the tree and found a leaf node 702. Further assume that the leaf node container 704 is already full. The current leaf node 702 may be converted to a non-leaf node, spawning four new leaf nodes, in order to create more space in the tree. The median values 708 of the X coordinates and the Y coordinates found in container 704 may be used as the demarcation points for creating the new leaf nodes. Observing the X/Y data values found in the leaf node container 704, the median X/Y values may be easily determined. In this example, the (median X value is 128.2, and the median Y value is 19.6). Leaf node 702 is converted to non-leaf node 802, with an X value of 128.2 and a Y value of 19.6. Each of the nine X/Y coordinates found in leaf node container 704 may be reinserted into the tree, as shown in step 912 and is placed in one of the four new leaf nodes. This reinsertion is accomplished by taking each separate X/Y coordinate and applying the insertion routine described in FIG. 9.

Third Data Structure—Location Sets

As previously stated, object descriptor record 204 is a record held in computer memory that holds information about the object to which it refers. In one embodiment, the objects described by object descriptor records represent MUs. They may, however, also be SU's or some other telecommunications unit. Object descriptor record 204 may be a record in an array, or a node of a linked list, or in some other data structure known in the art. In one embodiment (shown in FIG. 2B), object descriptor records are stored nodes of a linked list. Each object descriptor record 204 has a field in which to store an object identifier 220 (object_ID), a field or fields in which location coordinates may be held, for example $X_{object\_ID}$ 221 and $Y_{object\_ID}$ 222, and a leaf pointer 223 that points to a leaf node 400 in a tree structure 300 (see FIG. 3). The leaf pointer 223 need not be part of the object descriptor record. It may in other embodiments of the present invention be part of the linked list node(s). In some embodiments, only the record in the first node in the linked list will have a leaf pointer 223 to the leaf node while the other records have NULL leaf pointers, in other embodiments, however, multiple records in the linked list may have a leaf pointer 223 to the leaf node 206 in the tree structure 300. Object descriptor records with identical location coordinates may be placed together in linked lists. Such a placement allows the system to easily locate all object descriptor records 204 with identical location coordinates by locating just a single object descriptor with those same coordinates. This exact process will be further described below. Each node containing an object descriptor record 204 may contain a head pointer field 207 and a tail pointer field 208 in order to provide two-way linking with other object descriptor records having similar or identical location coordinates.

Building and Maintaining the Datastore

Referring again to FIG. 2, assume that new MUs (i.e. those previously unknown to the moving point server) send moving point data in the form of location coordinates and an object identifier to the moving point server. This moving point data may be added to the datastore. First, a new cell 203 may be allocated for this MU in object handler 202. The object identifier for that MU is inserted into that cell. An object descriptor record is created, and is referenced by cell 203 that was created to store the record identifier. This reference may take the form of a record pointer, but it is well-understood in the art that the reference might be another method of locating data in memory. The object descriptor record may contain at least an object identifier and a set of location coordinates. However, the object descriptor is not limited to such data. It may be appropriate to include other data such as data indicative of one or more particular preference(s) associated with the MU.

Object descriptor record 204 may be placed into datastore 106 in the same linked list as other object descriptor records with identical or near identical location coordinates. If no similar location already exist, then it is placed in its own linked list as the only node. Placing the object descriptor records in linked lists allows the system to easily determine those MUs which are similarly located. Moreover, the utilization of the linked lists also prevents the unnecessary population of the tree structure. For example, consider a location-aware network that is capable of recognizing measurements to a granularity of 100 square feet. Those MUs whose object coordinate measurements are identical (i.e. within the same 100 square foot space), may be represented in object descriptor records that are placed together in a linked list 209 or some other type data structure (e.g. doubly linked list, array, etc.) known in the art. When an object descriptor record is added to the linked list 209, a new record is not added to the tree structure 300. The tree structure 300 is used to store location coordinates rather than MU identities. Thus, if a new MU is passed into the moving point server 105 and that MU is identically located to existing MUs in datastore 106, then tree structure 300 already has an entry for that particular location and does not need another. Storing these repetitive location coordinate in the tree may cause the tree to unnecessarily grow more quickly, thereby making searches of and additions to the tree more expensive transactions (thereby reducing performance).

In order for the system to maintain accurate location data for MUs, the locations of MUs must be updated frequently. In order to keep the location data accurate and up-to-date, and old (outdated or inaccurate) location data for MUs may be purged as new data is received.

In an updating scenario, moving point server 105 receives moving point data in the form of location coordinates and an object identifier for an MU over reliable connection 104 from interface 103 that communicates with database server 101. If reference to the MU is not already stored in the object handler 202 of the datastore then this entry constitutes new moving point data and an object handler cell 203 is populated with the received moving point data as described above. However, if upon receiving moving point data from interface 103, the system discovers that there is already a cell in the object handler having an identical object identifier to that received, then this MU is already in the datastore and must be updated rather than added. The system may discover the existence of the identical object identifier by searching each cell 203 in object handler 202 for the same coordinates as received from the 103.

Assuming the received moving point data has an identifier already in the system, moving point server 105 updates, if necessary, the existing data that represents the MU specified in the object identifier. First, the received location coordinates are compared to the existing location coordinates in the object descriptor record 204 that already exists for that particular MU. If the location coordinates are the same in the received moving point data and the current object descriptor record, then no changes are necessary, because the location of the MU has not changed. If, however, the compared values are different, the object descriptor record may be modified in one of three ways, dependant on the situation created by the object descriptor record's placement in linked list 209. In present embodiment, the modification consists of deleting the object descriptor record and any related reference to it in the tree structure, and then replacing the deleted object descriptor record with the new moving point data by inserting the new moving point data into the datastore as described above. In other embodiments, however, the modification to the datastore may consist of actually changing record values rather than deleting and replacing them.

Referring back to FIG. 2, the first situation involves the instance where the object descriptor record is not part of linked list 210. In these cases, the object descriptor record does not share identical coordinates with any other object descriptor record. It does, however, necessarily have a leaf node 400 that it references in tree structure 300. Also, a record in container 402 stored in that same leaf node 400 references object descriptor record 204 via a pointer 404 or some other reference variable. The record in container 402 is removed along with its pointer reference 404 to object descriptor record 204. Object descriptor record 204 is then deleted, and a new object descriptor record is created using the process described previously with the new location data.

In the situation where object descriptor record 204 is part of linked list 209, but not at the head of the linked list, that record may be removed from the linked list and a new object descriptor record based upon the new location coordinates is created using the process previously described. Because, in one embodiment, no record in the tree structure points to a non-head node of a linked list 209, no changes may be necessary to the tree structure.

A third situation involves instances where the modified location coordinates are received for an object descriptor record that is at the head of a linked list of other object descriptor records. Here, the object descriptor record 204 should be deleted from the linked list and its corresponding location pointer reference 404 in the leaf node of the tree modified to point to the first remaining item in the linked list 209. This change modification of the pointer reference may be accomplished through the use of temporary pointer variables or some other technique known in the art. Once the object descriptor record has been deleted, a new object descriptor record is created by the system using the methods described herein.

Searching the Datastore

Building and maintenance of the datastore 206 as taught herein provides the ability for efficient and precise proximity searches by the moving point server. A proximity search occurs when the moving point server receives a request for the set of MU's that are proximately located to a given location. See FIG. 5. In a proximity search, when a set of coordinates are received from an MU by the moving point server 105, the moving point server 105 first searches the tree structure 300 for a leaf node 400 that encapsulates the received coordinates. The tree structure is searched using the method described above for inserting a coordinate pair into the tree.

Object descriptor records 204 pointed to by container array pointers 404 (and any other object descriptor records they are linked to as shown in FIG. 2) are retrieved and sent back to the interface 103. The interface 103 then will convert the data into a format that can be read by a database query language such as SQL or some other language known in the art. Once this conversion takes place, the database server may access the data set as it would a typical datasource and return the result set to the MU making the original request.

FIGS. 5A–5G illustrate steps of subroutines that may be used in one or more of the above described embodiments. One or more of the illustrated subroutines may be used in each embodiment. Other subroutines may also be used, and some subroutines may be combined and performed in a single subroutine instead of separately.

Figure 10A:
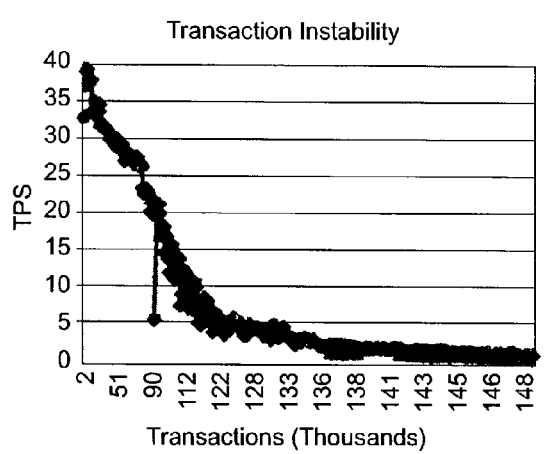
FIG. 10 illustrates graphically the performance over time of the invention and the prior art.
Figure 10B:
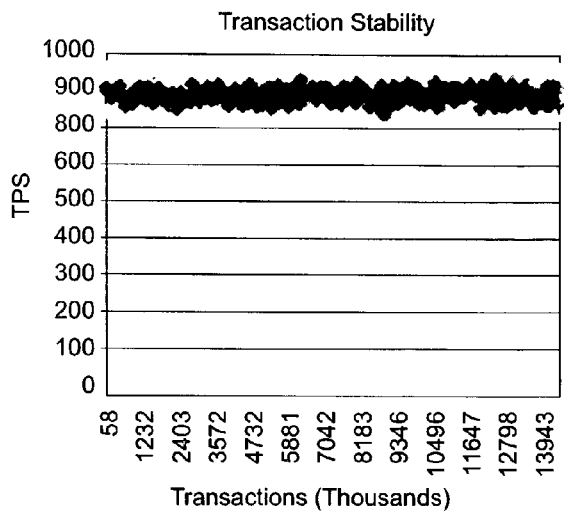

The invention as described herein provides a significant improvement over spatial solutions currently known in the art. Referring to FIG. 10A, in benchmark tests conducted at Sun Benchmark Center, aspects of this invention were able to complete more than 800 transactions per second without diminished performance over an extended period of time. A spatial solution known in the art was found to complete less than 40 transactions per second. Moreover, performance immediately degraded and came to a halt around 100,000 transactions. These results are depicted graphically in FIG. 10B.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method of indexing a database containing dynamic locations of mobile units (MU) in an N-level tree data structure including a root node, branch nodes, and leaf nodes, wherein the root node corresponds to a coverage area, and each subsequent branch or leaf node corresponds to a sub-area of the previous node's coverage area, comprising the steps of:
   adding an MU to a leaf node corresponding to a coverage area in which the MU is located; and
   recursively recomputing the center of each ancestor node, wherein the center corresponds to a center of all the MUs contained within the coverage area corresponding to that node.

2. The method of claim 1 wherein each node holds the geometric center of mass of all MUs reachable from that node.

3. The method of claim 1, further comprising:
   responsive to a determination that the position of the MU has changed, removing the MU from the leaf node; and
   adding the MU to a second leaf node corresponding to a second coverage area in which the MU is located.

4. The method of claim 3 wherein the second leaf node is the leaf node.

5. The method of claim 3 further comprising responsive to removing the MU from the leaf node, recentering the leaf node and each of its ancestor nodes.

6. The method of claim 3 further comprising responsive to adding the MU to the second leaf node, recentering the second leaf node and each of its ancestor nodes.

7. The method of claim 1 wherein adding the MU to the leaf node further comprises:
   descending from a root node to a leaf node along a path of the tree; and
   adding the MU to the leaf node at the end of the path.

8. The method of claim 7 wherein descending from a parent node on the path to a child node on the path occurs responsive to a determination that the MU is closer to the child node's center of mass than to the center of mass of any siblings of the child node.

9. The method of claim 7 further comprising:
   descending from a first node in the path to a second node in the path by:
      determining a center-of-mass for each child of the first node; and
      responsive to each determined center-of-mass being farther than a predetermined distance, creating a new child node having a center of mass equal to that of the MU; and
      descending to the new child node.

10. The method of claim 9 wherein the predetermined distance is associated with the level of the first node.

11. The method of claim 9 wherein a maximum number of child nodes can be added to a parent, and the new child node is created only if the root node has fewer than the maximum number of child nodes.

12. The method of claim 7 further comprising:
   determining that a first node has no children;
   crating a new node, the new node being a child of the first node; and
   descending to the new node.

13. The method of claim 7 wherein navigating from a parent node on the path to a child node on the path occurs responsive to a determination that the MU is within a polygon enclosing the child node's center of mass.

14. The method of claim 13 further comprising:
   responsive to a determination that the MU is not within a polygon enclosing any child node's center of mass:

creating a new child node and an associated polygon, the MU located inside the associated polygon's center of mass; and descending to the new child node.

15. The method of claim 14 wherein a maximum number of child nodes can be added to a parent, and the new child node is created only if the parent node has fewer than the maximum number of child nodes.

16. A system for indexing a database of dynamic locations of mobile units (MU) comprising:

a mobile positioning center adapted to receive location information from one or more MUs;

a database wherein locations of the MUs are stored;

a computer comprising a memory adapted with computer readable instructions for maintaining a database index in an N-level tree data structure including a root node, branch nodes, and leaf nodes, wherein the root node corresponds to a coverage area, and each subsequent branch or leaf node corresponds to a sub-area of the previous node's coverage area; wherein said index is maintained by:

adding an MU to a leaf node corresponding to a coverage area in which the MU is located; and recursively recomputing the center of each ancestor node, wherein the center corresponds to a center of all the MUs contained within the coverage area corresponding to that node.

* * * * *